(12) United States Patent
Deering

(10) Patent No.: US 6,664,955 B1
(45) Date of Patent: Dec. 16, 2003

(54) GRAPHICS SYSTEM CONFIGURED TO INTERPOLATE PIXEL VALUES

(75) Inventor: Michael F. Deering, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/526,327

(22) Filed: Mar. 15, 2000

(51) Int. Cl.[7] .............. G06F 17/00; G06T 1/00; G06T 17/00
(52) U.S. Cl. ............ 345/418; 345/428; 345/545; 345/606; 345/613; 345/615
(58) Field of Search ............... 345/501, 502, 345/505–506, 418–421, 426–428, 581–582, 589, 592, 606, 610, 611, 522, 538, 545, 531, 555, 422, 423, 424, 612, 613, 614, 615, 696, 698, 690, 694, 695

(56) References Cited

U.S. PATENT DOCUMENTS

| 5,117,289 | A | | 5/1992 | Farley et al. | |
| 5,481,275 | A | * | 1/1996 | Mical et al. | 345/611 |
| 5,619,438 | A | | 4/1997 | Farley et al. | |
| 5,757,375 | A | * | 5/1998 | Kawase | 345/428 |
| 5,771,046 | A | * | 6/1998 | Izawa et al. | 345/327 |
| 5,790,125 | A | * | 8/1998 | Bui et al. | 345/589 |
| 5,841,447 | A | * | 11/1998 | Drews | 345/523 |
| 6,188,394 | B1 | * | 2/2001 | Morein et al. | |
| 6,268,875 | B1 | * | 7/2001 | Duluk, Jr. et al. | 345/506 |
| 6,362,818 | B1 | * | 3/2002 | Gardiner et al. | 345/421 |
| 6,417,861 | B1 | * | 7/2002 | Deering et al. | 345/589 |
| 6,424,343 | B1 | * | 7/2002 | Deering et al. | 345/419 |
| 6,426,755 | B1 | * | 7/2002 | Deering | 345/581 |
| 6,459,428 | B1 | * | 10/2002 | Burk et al. | 345/419 |
| 6,466,206 | B1 | * | 10/2002 | Deering | 345/419 |
| 6,483,504 | B1 | * | 11/2002 | Deering | 345/419 |
| 6,489,956 | B1 | * | 12/2002 | Deering | 345/419 |
| 6,496,186 | B1 | * | 12/2002 | Deering | 345/419 |
| 6,496,187 | B1 | * | 12/2002 | Deering et al. | 345/419 |
| 6,525,723 | B1 | * | 2/2003 | Deering | 345/419 |
| 6,577,312 | B2 | * | 6/2003 | Deering et al. | 345/428 |

* cited by examiner

Primary Examiner—Matthew C. Bella
Assistant Examiner—Wesner Sajous
(74) Attorney, Agent, or Firm—Meyertons Hood Kivlin Kowert & Goetzel, P.C.; Jeffrey C. Hood

(57) ABSTRACT

A method and computer graphics system capable of super-sampling and performing real-time convolution are disclosed. In one embodiment, the computer graphics system may comprise a graphics processor, a sample buffer, and a sample-to-pixel calculation unit. The graphics processor may be configured to generate a plurality of samples. The sample buffer, which is coupled to the graphics processor, may be configured to store the samples. The sample-to-pixel calculation unit is programmable to generate a first subset of pixels by filtering using the rendered samples and a second subset of the output pixels by interpolating using the first subset of pixels and/or the rendered samples. By interpolating a subset of the output pixels, the graphics system may be able to operate at higher resolutions and/or refresh rates since filtering of the samples is computationally intensive. Any ratio of the number of first subset of pixels to the number of the second subset of pixels may be used, and furthermore, a different ratio may be used for different regions of the display screen. A higher ratio of the number of first subset of pixels to the number of second subset of pixels may be used for regions of the screen where a higher quality image is desired and a lower ration may be used for regions where a lower quality image may be sufficient. For example, a higher quality image may be desired close to and around the foveation point where the eye of an observer is focused.

62 Claims, 20 Drawing Sheets

GRAPHICS SYSTEM CONFIGURED TO INTERPOLATE PIXEL VALUES

BACKGROUND OF THE INVENTION

1. Field of the Invention

This invention relates generally to the field of computer graphics and, more particularly, to high performance graphics systems.

2. Description of the Related Art

A computer system typically relies upon its graphics system for producing visual output on the computer screen or display device. Early graphics systems were only responsible for taking what the processor produced as output and displaying that output on the screen. In essence, they acted as simple translators or interfaces. Modem graphics systems, however, incorporate graphics processors with a great deal of processing power. They now act more like coprocessors rather than simple translators. This change is due to the recent increase in both the complexity and amount of data being sent to the display device. For example, modem computer displays have many more pixels, greater color depth, and are able to display images that are more complex with higher refresh rates than earlier models. Similarly, the images displayed are now more complex and may involve advanced techniques such as anti-aliasing and texture mapping.

As a result, without considerable processing power in the graphics system, the CPU would spend a great deal of time performing graphics calculations. This could rob the computer system of the processing power needed for performing other tasks associated with program execution and thereby dramatically reduce overall system performance. With a powerful graphics system, however, when the CPU is instructed to draw a box on the screen, the CPU is freed from having to compute the position and color of each pixel. Instead, the CPU may send a request to the video card stating: "draw a box at these coordinates". The graphics system then draws the box, freeing the processor to perform other tasks.

Generally, a graphics system in a computer (also referred to as a graphics system) is a type of video adapter that contains its own processor to boost performance levels. These processors are specialized for computing graphical transformations, so they tend to achieve better results than the general-purpose CPU used by the computer system. In addition, they free up the computer's CPU to execute other commands while the graphics system is handling graphics computations. The popularity of graphical applications, and especially multimedia applications, has made high performance graphics systems a common feature of computer systems. Most computer manufacturers now bundle a high performance graphics system with their systems.

Since graphics systems typically perform only a limited set of functions, they may be customized and therefore far more efficient at graphics operations than the computer's general-purpose central processor. While early graphics systems were limited to performing two-dimensional (2D) graphics, their functionality has increased to support three-dimensional (3D) wire-frame graphics, 3D solids, and now includes support for three-dimensional (3D) graphics with textures and special effects such as advanced shading, fogging, alpha-blending, and specular highlighting.

The processing power of 3D graphics systems has been improving at a breakneck pace. A few years ago, shaded images of simple objects could only be rendered at a few frames per second, while today's systems support rendering of complex objects at 60 Hz or higher. At this rate of increase, in the not too distant future, graphics systems will literally be able to render more pixels than a single human's visual system can perceive. While this extra performance may be useable in multiple-viewer environments, it may be wasted in more common primarily single-viewer environments. Thus, a graphics system is desired which is capable of matching the variable nature of the human resolution system (i.e., capable of putting the quality where it is needed or most perceivable).

While the number of pixels is an important factor in determining graphics system performance, another factor of equal import is the quality of the image. For example, an image with a high pixel density may still appear unrealistic if edges within the image are too sharp or jagged (also referred to as "aliased"). One well-known technique to overcome these problems is anti-aliasing. Anti-aliasing involves smoothing the edges of objects by shading pixels along the borders of graphical elements. More specifically, anti-aliasing entails removing higher frequency components from an image before they cause disturbing visual artifacts. For example, anti-aliasing may soften or smooth high contrast edges in an image by forcing certain pixels to intermediate values (e.g., around the silhouette of a bright object superimposed against a dark background).

Another visual effect used to increase the realism of computer images is alpha blending. Alpha blending is a technique that controls the transparency of an object, allowing realistic rendering of translucent surfaces such as water or glass. Another effect used to improve realism is fogging. Fogging obscures an object as it moves away from the viewer. Simple fogging is a special case of alpha blending in which the degree of alpha changes with distance so that the object appears to vanish into a haze as the object moves away from the viewer. This simple fogging may also be referred to as "depth cueing" or atmospheric attenuation, i.e., lowering the contrast of an object so that it appears less prominent as it recedes. Types of fogging that are more complex go beyond a simple linear function to provide relationships that are more complex between the level of translucence and an object's distance from the viewer. Current state of the art software systems go even further by utilizing atmospheric models to provide low-lying fog with improved realism.

While the techniques listed above may dramatically improve the appearance of computer graphics images, they also have certain limitations. In particular, they may introduce their own aberrations and are typically limited by the density of pixels displayed on the display device.

As a result, a graphics system is desired which is capable of utilizing increased performance levels to increase not only the number of pixels rendered but also the quality of the image rendered. In addition, a graphics system is desired which is capable of utilizing increases in processing power to improve the results of graphics effects such as anti-aliasing.

Prior art graphics systems have generally fallen short of these goals. Prior art graphics systems use a conventional frame buffer for refreshing pixel/video data on the display. The frame buffer stores rows and columns of pixels that exactly correspond to respective row and column locations on the display. Prior art graphics system render 2D and/or 3D images or objects into the frame buffer in pixel form, and then read the pixels from the frame buffer during a screen refresh to refresh the display. Thus, the frame buffer stores the output pixels that are provided to the display. To reduce visual artifacts that may be created by refreshing the screen at the same time as the frame buffer is being updated, most graphics systems' frame buffers are double-buffered.

To obtain images that are more realistic, some prior art graphics systems have gone further by generating more than one sample per pixel. As used herein, the term "sample" refers to calculated color information that indicates the color, depth (z), transparency, and potentially other information, of a particular point on an object or image. For example, a sample may comprise the following component values: a red value, a green value, a blue value, a z value, and an alpha value (e.g., representing the transparency of the sample). A sample may also comprise other information, e.g., a z-depth value, a blur value, an intensity value, brighter-than-bright information, and an indicator that the sample consists partially or completely of control information rather than color information (i.e., "sample control information"). By calculating more samples than pixels (i.e., super-sampling), a more detailed image is calculated than can be displayed on the display device. For example, a graphics system may calculate four samples for each pixel to be output to the display device. After the samples are calculated, they are then combined or filtered to form the pixels that are stored in the frame buffer and then conveyed to the display device. Using pixels formed in this manner may create a more realistic final image because overly abrupt changes in the image may be smoothed by the filtering process.

These prior art super-sampling systems typically generate a number of samples that are far greater than the number of pixel locations on the display. These prior art systems typically have rendering processors that calculate the samples and store them into a render buffer. Filtering hardware then reads the samples from the render buffer, filters the samples to create pixels, and then stores the pixels in a traditional frame buffer. The traditional frame buffer is typically double-buffered, with one side being used for refreshing the display device while the other side is updated by the filtering hardware. Once the samples have been filtered, the resulting pixels are stored in a traditional frame buffer that is used to refresh the display device. These systems, however, have generally suffered from limitations imposed by the conventional frame buffer and by the added latency caused by the render buffer and filtering. Therefore, an improved graphics system is desired which includes the benefits of pixel super-sampling while avoiding the drawbacks of the conventional frame buffer.

Furthermore, previous super-sampled graphics systems attempt to generate every output pixel value by filtering the sample values, i.e., a computationally intensive process. In most cases, these traditional graphics systems are able to cope with typical display resolutions and/or refresh rates. However, in some instances, the graphics system may be requested to generate pixels corresponding to a display resolution and/or a refresh rate that is beyond the computational powers of the graphics system. Thus, a graphics system is desired that is capable of generating less than the requested number of pixels using filtering of sample values. The remaining of the requested pixels may then be generated by some other means.

In addition, a graphics system is desired that is capable of generating the requested pixels by filtering samples for one area of the display screen where a picture of high quality is desired and generating less than the requested number of pixels by filtering samples for other areas of the display screen where a lower quality picture is sufficient.

SUMMARY OF THE INVENTION

The present invention contemplates a computer graphics system that utilizes a sample buffer and a sample-to-pixel calculation unit for refreshing the display. In one embodiment, the graphics system may have a graphics processor, a super-sampled sample buffer, and a sample-to-pixel calculation unit. In another embodiment, the graphics system may have a graphics processor, a super-sampled sample buffer, a filtering unit, and an interpolation unit.

The graphics processor generates a plurality of samples and stores them into a sample buffer. The graphics processor preferably generates and stores more than one sample for at least a subset of the pixel locations on the display. Thus, the sample buffer may be a super-sampled sample buffer which stores a number of samples that, in some embodiments, may be far greater than the number of pixel locations on the display. In other embodiments, the total number of samples may be closer to, equal to, or even less than the total number of pixel locations on the display device, but the samples may be more densely positioned in certain areas and less densely positioned in other areas.

The sample-to-pixel calculation unit is configured to read the samples from the super-sampled sample buffer and filter or convolve the samples into respective output pixels, wherein the output pixels are then provided to refresh the display. Note that, as used herein, the terms "filter" and "convolve" are used interchangeably and refer to mathematically manipulating one or more samples to generate a pixel (e.g., by averaging, by applying a convolution function, by summing, by applying a filtering function, by weighting the samples and then manipulating them, by applying a randomized function, etc.). The sample-to-pixel calculation unit selects one or more samples and filters them to generate an output pixel. Note that the number of samples selected and or filtered by the sample-to-pixel calculation unit may be one or, in the preferred embodiment, greater than one.

The graphics system may operate without a conventional frame buffer, i.e., the graphics system does not utilize a conventional frame buffer that stores the actual pixel values that are being refreshed on the display. Note that some displays may have internal frame buffers, but these are considered an integral part of the display device, not the graphics system. Thus, the sample-to-pixel calculation units may calculate each pixel for each screen refresh on a real time basis. As used herein, the term "real-time" refers to a function that is performed at or near the display device's refresh rate." "On-the-fly" means at, near, or above the human visual system's perception capabilities for motion fusion (how often a picture must be changed to give the illusion of continuous motion) and flicker fusion (how often light intensity must be changed to give the illusion of continuous). These concepts are further described in the book "Spatial Vision" by Russel L. De Valois and Karen K. De Valois, Oxford University Press, 1988.

The sample-to-pixel calculation unit may be programmed to generate a first subset of the output pixels (filtered pixels) by filtering the rendered samples and to generate a second subset of the output pixels (interpolated pixels) by interpolating the filtered pixels and/or the rendered samples. A different ratio of filtered to interpolated pixels may be generated for different regions of the display or the same ratio may be used for the entire display. In one embodiment, the ratio may vary according to the location of the output pixel, for example, the distance of the output pixel from a viewer's point of foveation. As used herein, the term "point of foveation" refers to a point (e.g., on a display screen) on which the center of a viewer's eyes' field of vision is focused. This point may move as the viewer's eyes move. For example, the point of foveation (which moves as the viewer's eyes move) may be located at the exact center of the display screen when the viewer is focusing on a small object displayed at the center of the screen. Note that in the cases where a different image is displayed for each eye (e.g., for a 3D effect), two points of foveation may exist, one for each eye. In those cases, the ratio of filtered to interpolated pixels may vary according to the location of both points of foveation.

In one embodiment, the first and second subsets of pixels may comprise every other pixel in a screen-space line of the display. In other embodiments, the first subset of pixels may comprise one out of every three pixels, one out of every four pixels, etc, or any other ratio of first to second subset of pixels may be used.

In one embodiment, each interpolated pixel may be generated by interpolating two closest filtered pixels to the pixel. The two closest filtered pixels may or may not be along the same scan line of the display as the pixel. In an embodiment where the pixels are along the same scan line, only one pixel from the first subset needs to be cached at any time, and the sample-to-pixel calculation unit may alternately generate a filtered pixel and an interpolated pixel.

In other embodiments, the sample-to-pixel calculation unit may generate each interpolated pixel by interpolating: a closest filtered pixel and a closest sample to the interpolated pixel; two closest filtered pixels and two closest samples to the interpolated pixel; or two closest filtered pixels to the interpolated pixel. Note that in all the embodiments, the filtered pixels may or may not be along the same scan line as the interpolated pixel, and that the interpolation may be performed along a scan line (1D interpolation) or in the plane (2D interpolation).

The human visual system has varying levels of acuity, with the highest level of acuity occurring near the foveal pit of the retina. The foveal region receives light from the point of foveation and typically accounts for only a few degrees at the center of a human's of field of vision. Thus, to best match the human visual system, the graphics system may be, in some embodiments, configured to detect where the viewer's point of foveation is relative to the display device. This allows the graphics system to match the ratio of first to second subset of pixels to the human eye's acuity. Thus, a higher number of filtered/lower number of interpolated pixels (and more processing power) may be allocated to areas of the display device that will be perceived by the highest acuity regions of the human visual system. Similarly, a lower number of filtered/higher number of interpolated pixels and processing power will be devoted to regions that will be perceived by the lower acuity regions of the human visual system. Note, however, it is not just the density of rods and cones in the eye that may be matched. Other factors may also influence the perception of the human visual system, including the lens system, chromatic aberrations, and the neural pathways to the eye. For the purposes of matching computer displays to human retinal perception, the human brain's processing limits for visual input provides a useful target that future graphics systems may strive to match or exceed.

This type of graphics system may be implemented in a number of different ways. For example, eye-tracking sensors may be used to determine in what direction the viewer's eyes are directed. This may provide data with which to predict where the viewer's point of foveation is. Typically, head-mounted eye-tracking sensors may use an additional eye-tracking sensor. Taken together, the eye- and head-tracking sensors can provide useful information about the position and movement of a viewer's point of foveation relative to the display device. Even further accuracy may be obtained using two eye-tracking sensors (i.e., one for each of the viewer's eyes). Thus, two points of foveation may be detected for each viewer. Furthermore, in some configurations multiple viewers may each have their points of foveation detected. Other configurations may utilize a hand-tracking sensor (e.g., pointing wand or data glove) in combination with head- and or eye-tracking sensors. Another configuration may utilize a head-mounted display with various motion, direction, eye tracking, and or head-tracking sensors. A higher number of filtered/lower number of interpolated pixels (and more processing power) may be allocated to a region of a predetermined size centered at the calculated point of foveation to compensate for inaccuracies in the sensors. Note that, as used herein, the term "gaze tracking unit" refers to any combination of eye-tracking, head-tracking, hand tracking, and or body tracking sensors that provide information concerning one or more viewers' points of foveation (there can be two points of foveation for each viewer). Examples of gaze tracking units may include one or more of the following: video cameras, "EMG" sensors that detect electrical currents in muscles, an eye-and-head tracker, an eye tracker, a head tracker, a hand tracker, a data glove, a wand, a data suit, a mouse, a body position sensor, a body position sensing chair, motion sensors, pressure sensors, acoustic sensors, and infra-red scanners/sensors. In other embodiments, the system may assume that the viewer's point of foveation is located at a fixed location near the center of the screen, or at a varying point of interest on the display created by the software application being executed.

The graphics processor may be similarly configured to vary the number of filtered and number of interpolated pixels (and the processing power) for different regions of the displayed image. These different ratios may be positioned based on the point of interest, cursor position, eye tracking, head tracking, etc. In other embodiments, the ratio of the filtered to the interpolated pixels may be varied on a scan line basis, a per-pixel basis, or a per-frame region basis.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
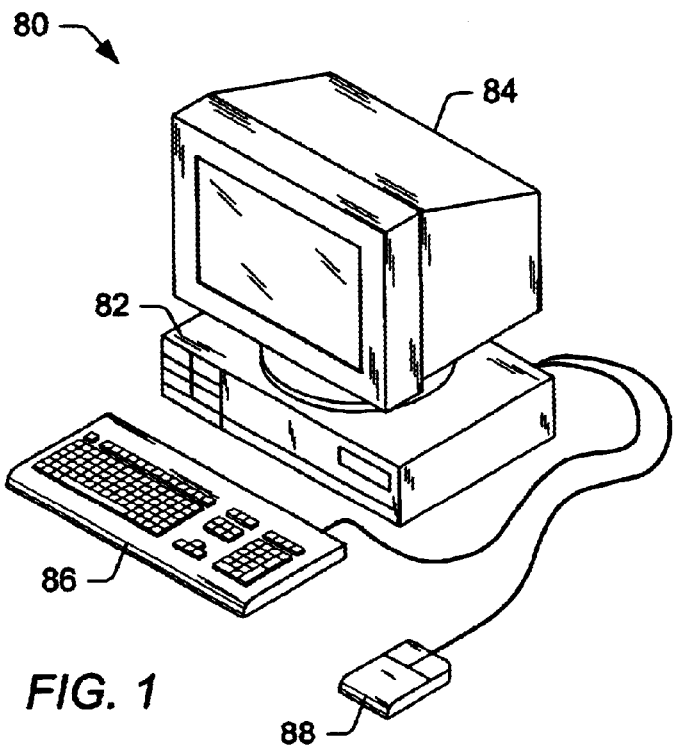
FIG. 1 illustrates one embodiment of a computer system that includes one embodiment of a graphics system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Computer System—FIG. 1

Referring now to FIG. 1, one embodiment of a computer system 80 that includes a three-dimensional (3-D) graphics system is shown. The computer system may be comprised in any of various systems, including a traditional PC, network PC, Internet appliance, a television, including HDTV systems and interactive television systems, set top boxes, game console, personal digital assistants (PDAs), and other devices which display 2D and or 3D graphics, among others.

As shown, the computer system 80 comprises a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, body sensors, etc.). Application software may be executed by the computer system 80 to display 3-D graphical objects on display device 84. As described further below, the 3-D graphics system in computer system 80 includes a super-sampled sample buffer with a programmable real-time sample-to-pixel calculation unit to improve the quality and realism of images displayed on display device 84.

Figure 2:
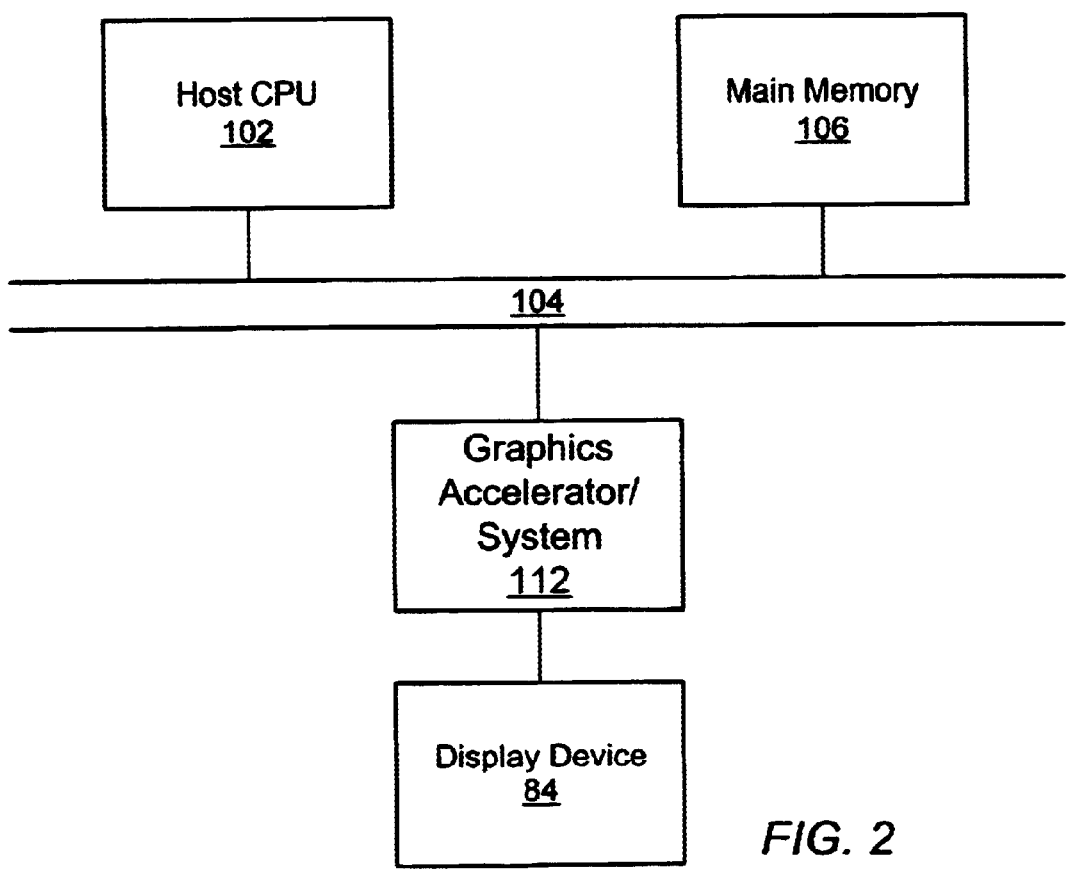
FIG. 2 is a simplified block diagram of the computer system of FIG. 1.

Computer System Block Diagram—FIG. 2

Referring now to FIG. 2, a simplified block diagram illustrating the computer system of FIG. 1 is shown. Elements of the computer system that are not necessary for an understanding of the present invention are not shown for convenience. As shown, the computer system 80 includes a central processing unit (CPU) 102 coupled to a high-speed memory bus or system bus 104 also referred to as the host bus 104. A system memory 106 may also be coupled to high-speed bus 104.

Host processor 102 may comprise one or more processors of varying types, e.g., microprocessors, multi-processors and CPUs. The system memory 106 may comprise any combination of different types of memory subsystems, including random access memories, (e.g., static random access memories or "SRAMs", synchronous dynamic random access memories or "SDRAMs", and Rambus dynamic access memories or "RDRAM", among others) and mass storage devices. The system bus or host bus 104 may comprise one or more communication or host computer buses (for communication between host processors, CPUs, and memory subsystems) as well as specialized subsystem buses.

A 3-D graphics system or graphics system 112 according to the present invention is coupled to the high-speed memory bus 104. The 3-D graphics system 112 may be coupled to the bus 104 by, for example, a crossbar switch or other bus connectivity logic. It is assumed that various other peripheral devices, or other buses, may be connected to the high-speed memory bus 104. It is noted that the 3-D graphics system may be coupled to one or more of the buses in computer system 80 and/or may be coupled to various types of buses. In addition, the 3D graphics system may be coupled to a communication port and thereby directly receive graphics data from an external source, e.g., the Internet or a network. As shown in the figure, display device 84 is connected to the 3-D graphics system 112 comprised in the computer system 80.

Host CPU 102 may transfer information to and from the graphics system 112 according to a programmed input/output (I/O) protocol over host bus 104. Alternately, graphics system 112 may access the memory subsystem 106 according to a direct memory access (DMA) protocol or through intelligent bus mastering.

A graphics application program conforming to an application programming interface (API) such as OpenGL™ or Java 3D™ may execute on host CPU 102 and generate commands and data that define a graphics primitive (graphics data) such as a polygon for output on display device 84. As defined by the particular graphics interface used, these primitives may have separate color properties for the front and back surfaces. Host processor 102 may transfer these graphics data to memory subsystem 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including the host CPU 102 and/or the system memory 106, other memory, or from an external source such as a network, e.g., the Internet, or from a broadcast medium, e.g., television, or from other sources.

As will be described below, graphics system 112 may be configured to allow more efficient microcode control, which results in increased performance for handling of incoming color values corresponding to the polygons generated by host processor 102. Note that while graphics system 112 is depicted as part of computer system 80, graphics system 112 may also be configured as a stand-alone device (e.g., with its own built-in display) or as part of another device, such as a PDA, television, or any other device with display capabilities. Graphics system 112 may also be configured as a single-chip device or as part of a system-on-a-chip or a multi-chip module.

Figure 3:
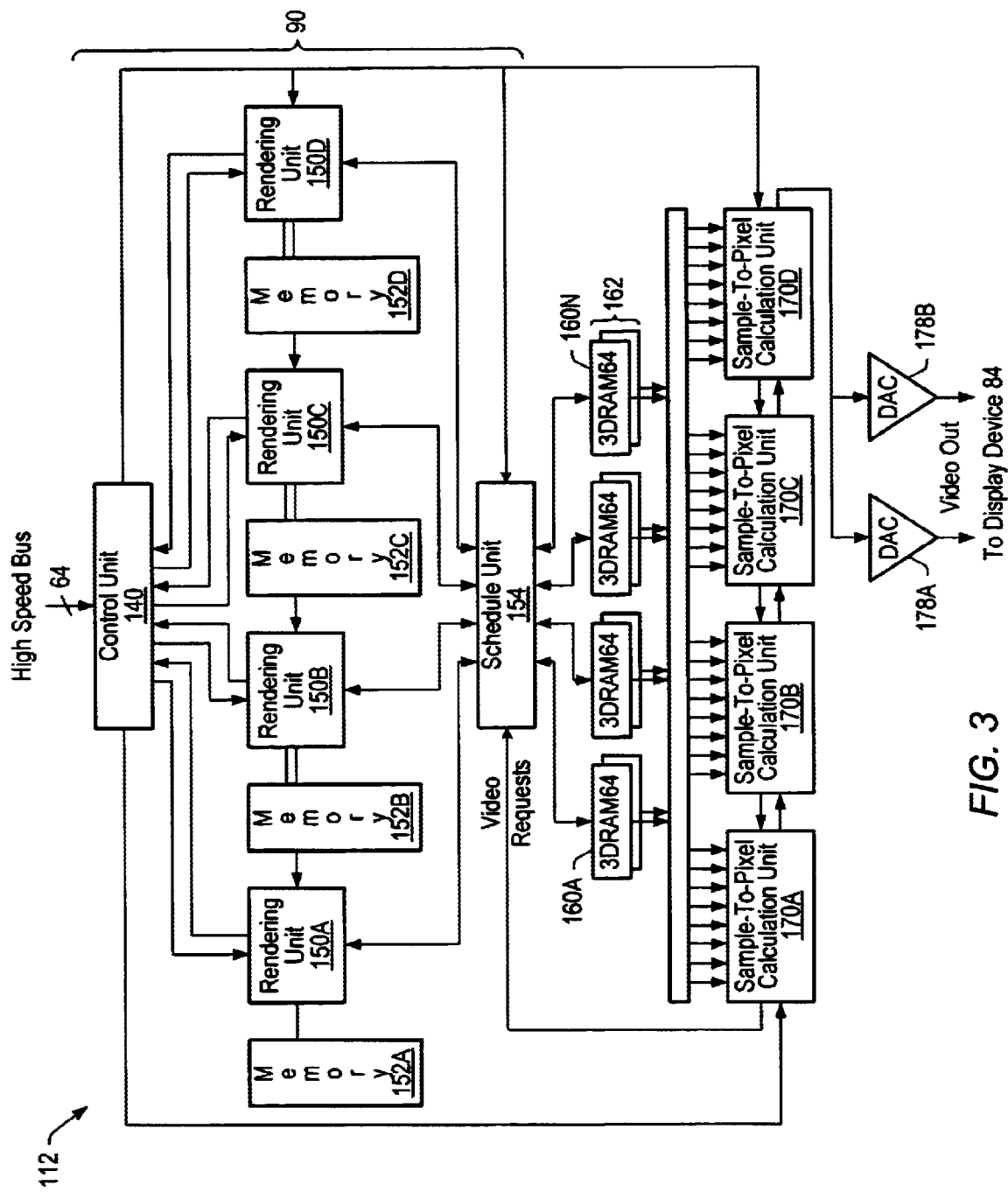
FIG. 3 is a block diagram illustrating more details of one embodiment of the graphics system of FIG. 1.

Graphics System—FIG. 3

Referring now to FIG. 3, a block diagram illustrating details of one embodiment of graphics system 112 is shown. As shown in the figure, graphics system 112 may comprise one or more graphics processors 90, one or more super-sampled sample buffers 162, and one or more sample-to-pixel calculation units 170A–D. Graphics system 112 may also comprise one or more digital-to-analog converters (DACs) 178A–B. Graphics processor 90 may be any suitable type of high performance processor (e.g., specialized graphics processors or calculation units, multimedia processors, DSPs, or general purpose processors). In one embodiment, graphics processor 90 may comprise one or more rendering units 150A–D. In the embodiment shown, however, graphics processor 90 also comprises one or more control units 140, one or more data memories 152A–D, and one or more schedule units 154. Sample buffer 162 may comprises one or more sample memories 160A–160N as shown in the figure.

A. Control Unit

Control unit 140 operates as the interface between graphics system 112 and computer system 80 by controlling the transfer of data between graphics system 112 and computer system 80. In embodiments of graphics system 112 that comprise two or more rendering units 150A–D, control unit 140 may also divide the stream of data received from computer system 80 into a corresponding number of parallel streams that are routed to the individual rendering units 150A–D. The graphics data may be received from computer system 80 in a compressed form. This may advantageously reduce the bandwidth requirements between computer system 80 and graphics system 112. In one embodiment, control unit 140 may be configured to split and route the data stream to rendering units 150A–D in compressed form.

The graphics data may comprise one or more graphics primitives. As used herein, the term graphics primitive includes polygons, parametric surfaces, splines, NURBS (non-uniform rational B-splines), sub-divisions surfaces, fractals, volume primitives, and particle systems. These graphics primitives are described in detail in the text book entitled "Computer Graphics: Principles and Practice" by James D. Foley, et al., published by Addison-Wesley Publishing Co., Inc., 1996. Note polygons are referred to throughout this detailed description for simplicity, but the embodiments and examples described may also be used with graphics data comprising other types of graphics primitives.

B. Rendering Units

Rendering units 150A–D (also referred to herein as draw units) are configured to receive graphics instructions and data from control unit 140 and then perform a number of functions, depending upon the exact implementation. For example, rendering units 150A–D may be configured to perform decompression (if the data is compressed), transformation, clipping, lighting, texturing, depth cueing, transparency processing, set-up, and screen space rendering of various graphics primitives occurring within the graphics data. Each of these features is described separately below.

Depending upon the type of compressed graphics data received, rendering units 150A–D may be configured to perform arithmetic decoding, run-length decoding, Huffman decoding, and dictionary decoding (e.g., LZ77, LZSS, LZ78, and LZW). In another embodiment, rendering units 150A–D may be configured to decode graphics data that has been compressed using geometric compression. Geometric compression of 3D graphics data may achieve significant reductions in data size while retaining most of the image quality. Two methods for compressing and decompressing 3D geometry are described in U.S. Pat. No. 5,793,371, application Ser. No. 08/511,294, (filed on Aug. 4, 1995, entitled "Method And Apparatus For Geometric Compression Of Three-Dimensional Graphics Data," and U.S. patent application Ser. No. 09/095,777, filed on Jun. 11, 1998, entitled "Compression of Three-Dimensional Geometry Data Representing a Regularly Tiled Surface Portion of a Graphical Object,". In embodiments of graphics system 112 that support decompression, the graphics data received by each rendering unit 150 is decompressed into one or more graphics "primitives" which may then be rendered. The term primitive refers to components of objects that define its shape (e.g., points, lines, triangles, polygons in two or three dimensions, polyhedra, or free-form surfaces in three dimensions). Rendering units 150 may be any suitable type of high performance processor (e.g., specialized graphics processors or calculation units, multimedia processors, DSPs, or general purpose processors).

Transformation refers to manipulating an object and includes translating the object (i.e., moving the object to a different location), scaling the object (i.e., stretching or shrinking), and rotating the object (e.g., in three-dimensional space, or "3-space").

Clipping refers to defining the limits of the displayed image (i.e., establishing a clipping region, usually a rectangle) and then not rendering or displaying pixels that fall outside those limits.

Lighting refers to calculating the illumination of the objects within the displayed image to determine what color and or brightness each individual object will have. Depending upon the shading algorithm being used (e.g., constant, Gourand, or Phong), lighting may be evaluated at a number of different locations. For example, if constant shading is used (i.e., each pixel of a polygon has the same lighting), then the lighting need only be calculated once per polygon. If Gouraud shading is used, then the lighting is calculated once per vertex. Phong shading calculates the lighting on a per-pixel basis.

Clipping refers to the elimination of graphics primitives or portions of graphics primitives that lie outside of a 3-D view volume in world space. The 3-D view volume may represent that portion of world space that is visible to a virtual observer situated in world space. For example, the view volume may be a solid cone generated by a 2-D view window and a viewpoint located in world space. The solid cone may be imagined as the union of all rays emanating from the viewpoint and passing through the view window. The viewpoint may represent the world space location of the virtual observer. Primitives or portions of primitives that lie outside the 3-D view volume are not currently visible and may be eliminated from further processing. Primitives or portions of primitives that lie inside the 3-D view volume are candidates for projection onto the 2-D view window.

In order to simplify the clipping and projection computations, primitives may be transformed into a second, more convenient, coordinate system referred to herein as the viewport coordinate system. In viewport coordinates, the view volume maps to a canonical 3-D viewport that may be more convenient for clipping against.

Graphics primitives or portions of primitives that survive the clipping computation may be projected onto a 2-D viewport depending on the results of a visibility determination. Instead of clipping in 3-D, graphics primitives may be projected onto a 2-D view plane (which includes the 2-D viewport) and then clipped with respect to the 2-D viewport.

Screen-space rendering refers to the calculations performed to actually calculate the data used to generate each pixel that will be displayed. In prior art systems, each pixel is calculated and then stored in a frame buffer. The contents of the frame buffer are then output to the display device to create the final image. In the embodiment of graphics system 112 shown in the figure, however, rendering units 150A–D calculate "samples" instead of actual pixel data. This allows rendering units 150A–D to "super-sample" or calculate more than one sample per pixel. Super-sampling is described in greater detail below. The rendering units 150A–D may also generate a greater area of samples than the viewable area of the display 84 for various effects such as panning and zooming. Note that rendering units 150A–B may comprises a number of smaller functional units, e.g., a separate set-up/decompress unit and a lighting unit.

More details on super-sampling are discussed in the following books: "Principles of Digital Image Synthesis" by Andrew Glassner, 1995, Morgan Kaufman Publishing (Volume 1); and "Renderman Companion:" by Steve Upstill, 1990, Addison Wesley Publishing.

C. Data Memories

Each rendering unit 150A–D may be coupled to an instruction and data memory 152A–D. In one embodiment, each data memory 152A–D may be configured to store both data and instructions for rendering units 150A–D. While implementations may vary, in one embodiment each data memory 152A–D may comprise two 8 MByte SDRAMs providing a total of 16 MBytes of storage for each rendering unit 150A–D. In another embodiment, RDRAMs (Rambus DRAMs) may be used to support the decompression and set-up operations of each rendering unit, while SDRAMs may be used to support the draw functions of rendering units 150A–D.

D. Schedule Unit

Schedule unit 154 may be coupled between the rendering units 150A–D and the sample memories 160A–N. Schedule unit 154 is configured to sequence the completed samples and store them in sample memories 160A–N. Note in larger configurations, multiple schedule units 154 may be used in parallel. In one embodiment, schedule unit 154 may be implemented as a crossbar switch.

E. Sample Memories

Super-sampled sample buffer 162 comprises sample memories 160A–160N, which are configured to store the plurality of samples generated by the rendering units. As used herein, the term "sample buffer" refers to one or more memories that store samples. As previously noted, samples are rendered into the sample buffer 162 at positions in the sample buffer which correspond to locations in screen space on the display. The positions may be calculated using various methods, such as grid-based position generation, stochastic position generation, or perturbed grid position generation, among others. The positions may be calculated or programmatically determined on a per frame basis, a per bin basis, or even a per sample basis. In one embodiment, sample position information is stored with the samples in the sample buffer.

One or more samples are then filtered to form each output pixels (i.e., pixels to be displayed on a display device). The number of samples stored may be greater than, equal to, or less than the total number of pixels output to the display device to refresh a single frame. Each sample may correspond to one or more output pixels. As used herein, a sample "corresponds" to an output pixel when the sample's information contributes to final output value of the pixel. Note, however, that some samples may contribute zero to is their corresponding output pixel after filtering takes place.

Stated another way, the sample buffer stores a plurality of samples that have positions that correspond to locations in screen space on the display, i.e., the samples contribute to one or more output pixels on the display. The number of stored samples may be greater than the number of pixel locations, and more than one sample may be combined in the convolution (filtering) process to generate a particular output pixel displayed on the display device. Any given sample may contribute to one or more output pixels.

Sample memories 160A–160N may comprise any of a number of different types of memories (e.g., SDRAMs, SRAMs, RDRAMs, 3DRAMs, or next-generation 3DRAMs) in varying sizes. In one embodiment, each schedule unit 154 is coupled to four banks of sample memories, wherein each bank comprises four 3DRAM-64 memories. Together, the 3DRAM-64 memories may form a 116-bit deep super-sampled sample buffer that stores multiple samples per pixel. For example, in one embodiment, each sample memory 160A–160N may store up to sixteen samples per pixel.

3DRAM-64 memories are specialized memories configured to support full internal double buffering with single buffered Z in one chip. The double buffered portion comprises two RGBX buffers, wherein X is a fourth channel that can be used to store other information (e.g., alpha). 3DRAM-64 memories also have a lookup table that takes in window ID information and controls an internal 2-1 or 3-1 multiplexer that selects which buffer's contents will be output. 3DRAM-64 memories are next-generation 3DRAM memories that may soon be available from Mitsubishi Electric Corporation's Semiconductor Group. In one embodiment, 32 chips used in combination are sufficient to create a double-buffered 1280×1024 super-sampled sample buffer.

Since the memories are internally double-buffered, the input pins for each of the two frame buffers in the double-buffered system are time multiplexed (using multiplexers within the memories). The output pins may similarly be time multiplexed. This allows reduced pin count while still providing the benefits of double buffering. 3DRAM-64 memories further reduce pin count by not having z output pins. Since z comparison and memory buffer selection is dealt with internally, this may simplify sample buffer 162 (e.g., using less or no selection logic on the output side). Use of 3DRAM-64 also reduces memory bandwidth since information may be written into the memory without the traditional process of reading data out, performing a z comparison, and then writing data back in. Instead, the data may be simply written into the 3DRAM-64, with the memory performing the steps described above internally.

However, in other embodiments of graphics system 112, other memories (e.g., SDRAMs, SRAMs, RDRAMs, or current generation 3DRAMs) may be used to form sample buffer 162.

Graphics processor 90 may be configured to generate a plurality of sample positions according to a particular sample-positioning scheme (e.g., a regular grid, a perturbed regular grid, stochastic, etc.). The sample position information for each of the samples may be stored for later use by the sample-to-pixel calculation unit(s). For example, the graphics processor 90 may store the sample position information in the sample buffer with the samples, or may store the sample position information in a separate sample position memory. Alternatively, the sample positions (or position information (e.g., offsets that are added to regular grid positions to form the sample positions) may be pre-determined or pre-computed using one of the above schemes and simply read from the sample position memory (e.g., a RAM/ROM table). The sample position information may be pre-computed by the graphics processor, by the host CPU, or by other logic.

The sample position information may comprise coordinate values relative to a sample buffer coordinate system, e.g., coordinate values relative to the display screen space. The sample position information may also comprise offset values, wherein the offset values are relative to pre-defined locations in the sample buffer, such as a pre-defined regular grid, pre-defined bins, or pixel center coordinates.

Upon receiving a polygon that is to be rendered, graphics processor 90 determines which samples reside within the polygon based upon the sample position information. Graphics processor 90 renders the samples that reside within the polygon and stores rendered samples in sample memories 160A–N. Note that as used herein the terms "render" and "draw" are used interchangeably and refer to calculating color values for samples. Depth samples, including one or more of color values, depth values, alpha values, blur values, and other per-sample values may also be calculated in the rendering or drawing process.

F. Sample-to-pixel Calculation Units

Sample-to-pixel calculation units 170A–D (sometimes collectively referred to as sample-to-pixel calculation unit 170) may be coupled between sample memories 160A–N and DACs 178A–B. Sample-to-pixel calculation units 170A–D are configured to read selected samples from sample memories 160A–N, wherein the 160A–N samples are selected based on the position information of the samples, and then perform a convolution (e.g., a filtering and weighting function or a low pass filter) on the samples to generate the output pixel values which are output to DACs 178A–B. The sample-to-pixel calculation units 170A–D may be programmable to allow them to perform different filter functions at different times, depending upon the type of output desired.

In one embodiment, the sample-to-pixel calculation units 170A–D may implement a super-sample reconstruction band-pass filter to convert the super-sampled sample buffer data (stored in sample memories 160A–N) to single pixel values. The support of the band-pass filter may cover a rectangular area M pixels high and N pixels wide. Thus, the number of samples covered by the band-pass filter is approximately equal to $M \cdot N \cdot S$, where S is the number of samples per pixel. A variety of values for M, N, & S are contemplated. For example, in one embodiment of the band-pass filter M=N=5. It is noted that with certain sample positioning schemes, the number of samples that fall within the filter support may vary as the filter center (i.e., pixel center) moves.

In other embodiments, calculation units 170A–D may filter a selected number of samples to calculate an output pixel. The selected samples may be multiplied by a spatial weighting function that gives weights to samples based on their position with respect to the center of the pixel being calculated.

The filtering operations performed by sample-to-pixel calculation units 170 may use any of a variety of filters, either alone or in combination. For example, the filtering operations may comprise convolution with a box filter, a tent filter, a cylindrical filter, a cone filter, a Gaussian filter, a Catmull-Rom filter, a Mitchell-Netravali filter, a windowed Sinc filter, etc. Furthermore, the support of the filters used by sample-to-pixel calculation units 170 may be circular, elliptical, rectangular (e.g., square), triangular, hexagonal, etc.

Sample-to-pixel calculation units 170A–D may also be configured with one or more of the following features: color look-up using pseudo color tables, direct color, inverse gamma correction, filtering of samples to pixels, and conversion of pixels to non-linear light space. Other features of sample-to-pixel calculation units 170A–D may include programmable video timing generators, programmable pixel clock synthesizers, cursor generators, color space converters, and crossbar functions. Once the sample-to-pixel calculation units have manipulated the timing and color of each pixel, the pixels are output to DACs 178A–B.

G. DACs

DACs 178A–B operate as the final output stage of graphics system 112. The DACs 178A–B serve to translate the digital pixel data received from cross units 174A–B into analog video signals that are then sent to the display device. Note in one embodiment DACs 178A–B may be bypassed or omitted completely in order to output digital pixel data in lieu of analog video signals. This may be useful when display device 84 is based on a digital technology (e.g., an LCD-type display, LCOS display, or a digital micro-mirror display).

Figure 4:
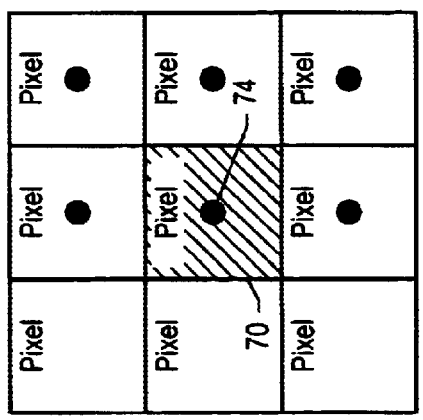
FIG. 4 is diagram illustrating traditional pixel calculation.

Super-Sampling—FIGS. 4–5

Turning now to FIG. 4, an example of traditional, non-super-sampled pixel value calculation is illustrated. Each pixel has exactly one data point calculated for it, and the single data point is located at the center of the pixel. For example, only one data point (i.e., sample 74) contributes to value of pixel 70.

Figure 5B:
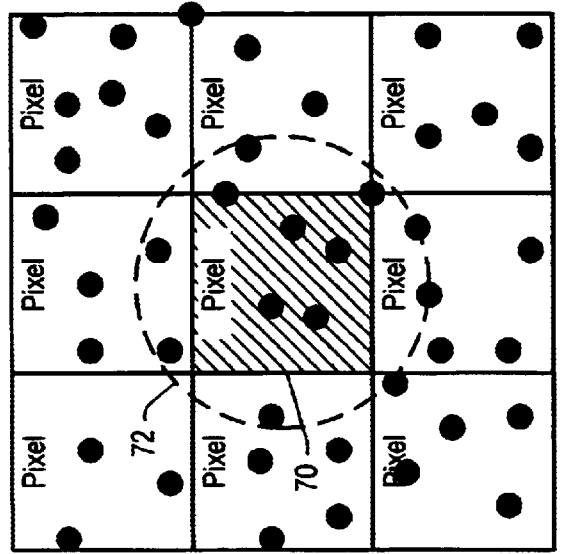
FIG. 5B is diagram illustrating a random distribution of samples.
Figure 5A:
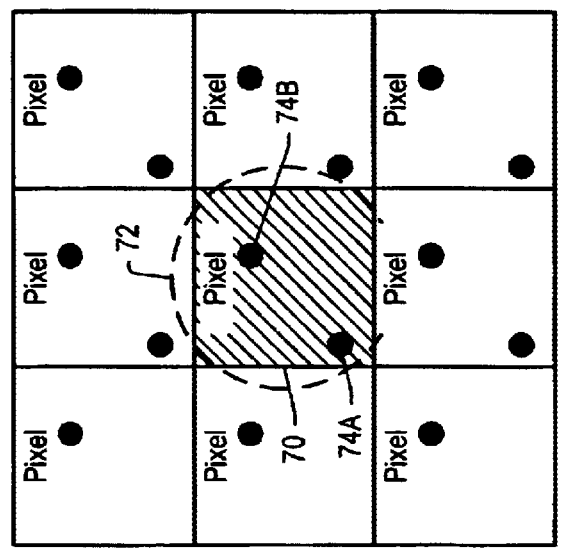
FIG. 5A is diagram illustrating one embodiment of super-sampling.
Figure 6:
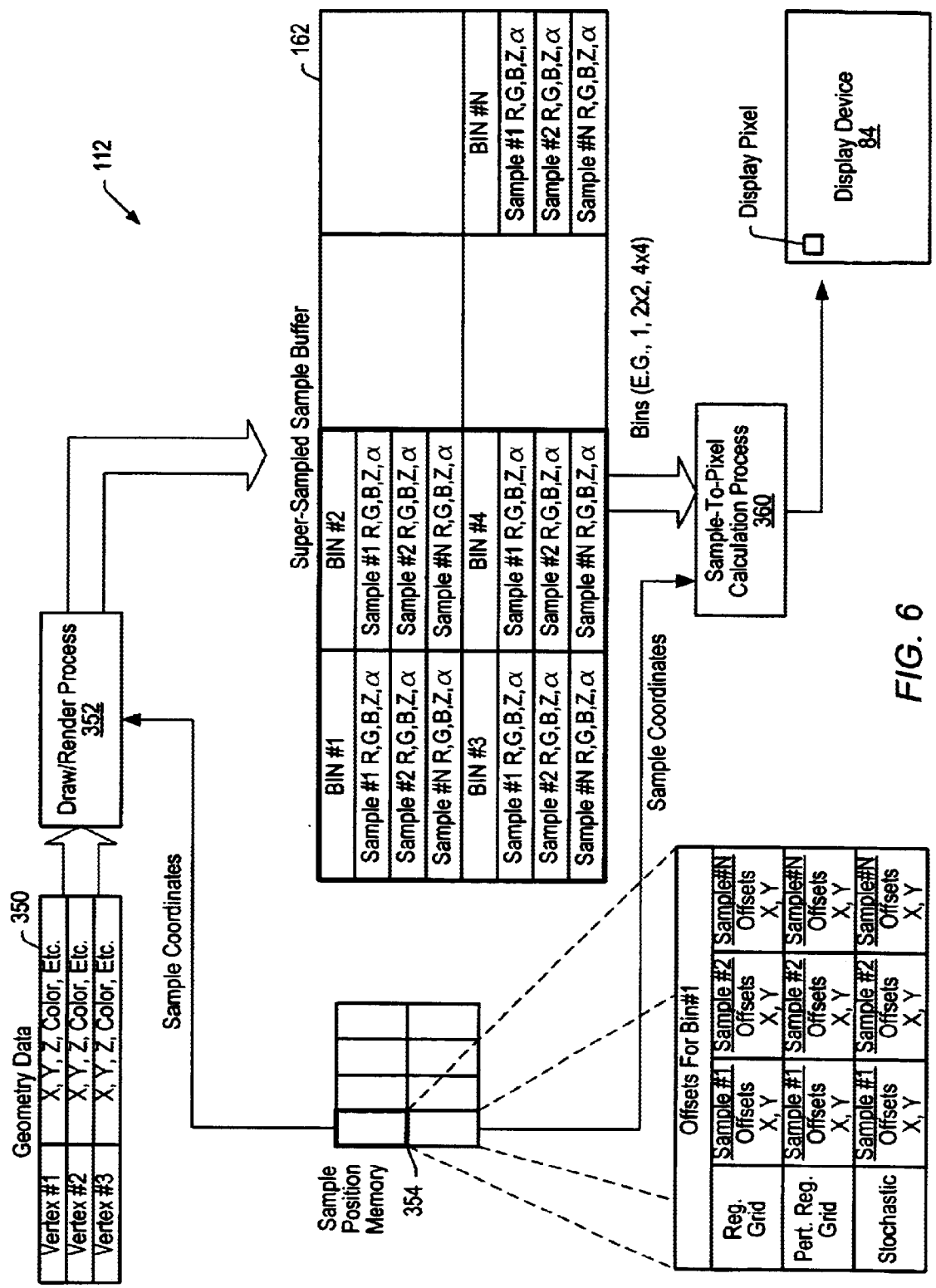
FIG. 6 is a diagram illustrating details of one embodiment of a graphics system having one embodiment of a variable resolution super-sampled sample buffer.

Turning now to FIG. 5A, an example of one embodiment of super-sampling is illustrated. In this embodiment, a number of samples are calculated. The number of samples may be related to the number of pixels or completely independent of the number of pixels. In this example, there are 18 samples distributed in a regular grid across nine pixels. Even with all the samples present in the figure, a simple one to one correlation could be made (e.g., by throwing out all but the sample nearest to the center of each pixel). However, the more interesting case is performing a filtering function on multiple samples to determine the final pixel values. Also, as noted above, a single sample can be used to generate a plurality of output pixels, i.e., sub-sampling.

A circular filter 72 is illustrated in the figure. In this example, samples 74A–B both contribute to the final value of pixel 70. This filtering process may advantageously improve the realism of the image displayed by smoothing abrupt edges in the displayed image (i.e., performing anti-aliasing). Filter 72 may simply average samples 74A–B to form the final value of output pixel 70, or it may increase the contribution of sample 74B (at the center of pixel 70) and diminish the contribution of sample 74A (i.e., the sample farther away from the center of pixel 70). Circular filter 72 is repositioned for each output pixel being calculated so the center of filter 72 coincides with the center position of the pixel being calculated. Other filters and filter positioning schemes are also possible and contemplated.

Turning now to FIG. 5B, another embodiment of super-sampling is illustrated. In this embodiment, however, the samples are positioned randomly. More specifically, different sample positions are selected and provided to graphics processor 90 (and render units 150A–D), which calculate color information to form samples at these different locations. Thus the number of samples falling within filter 72 may vary from pixel to pixel.

Super-sampled Sample Buffer with Real-time Convolution—FIGS. 6—13

FIGS. 6A, 6B, 7A and 7B illustrate possible configurations for the flow of data through one embodiment of graphics system. As the figures show, geometry data 350 is received by graphics system 112 and used to perform draw or render process 352. The draw process 352 is implemented by one or more of control unit 140, rendering units 150, memories 152, and schedule unit 154. Geometry data 350 comprises data for one or more polygons. Each polygon comprises a plurality of vertices (e.g., three vertices in the case of a triangle), some of which may be shared. Data such as x, y, and z coordinates, color data, lighting data and texture map information may be included for each vertex.

In addition to the vertex data, draw process 352 (which may be performed by rendering units 150A–D) also receives sample position information from a sample position memory 354. Draw process 352 selects the samples that fall within the polygon currently being rendered and calculates a set of values (e.g. red, green, blue, z, alpha, and/or depth of field information) for each of these samples based on their respective positions within the polygon. For example, the z value of a sample that falls within a triangle may be interpolated from the known z values of the three vertices. Each set of computed sample values are stored into sample buffer 162.

In one embodiment, sample position memory 354 is embodied within rendering units 150A–D. In another embodiment, sample position memory 354 may be realized as part of memories 152A–152D, or as a separate memory.

Sample position memory 354 may store sample positions in terms of their sample (virtual) screen coordinates (X, Y). Alternatively, sample position memory 354 may be configured to store only offsets dX and dY for the samples with respect to positions on a regular grid. Storing only the offsets may use less storage space than storing the entire coordinates (X, Y) for each sample. The sample position information stored in sample position memory 354 may be read by a dedicated sample-position calculation unit (not shown) and processed to calculate sample positions for graphics processing unit 90.

In another embodiment, sample position memory 354 may be configured to store a table of random numbers. Sample position memory 354 may also comprise dedicated hardware to generate one or more different types of regular grids. This hardware may be programmable. The stored random numbers may be added as offsets to the regular grid positions generated by the hardware. In one embodiment, sample position memory 354 may be programmable to access or "unfold" the random number table in a number of different ways, and thus may deliver more apparent randomness for a given length of the random number table. Thus, a smaller table may be used without generating the visual artifacts caused by simple repetition of sample position offsets.

Sample-to-pixel calculation process 360 uses the same sample positions as draw process 352. Thus, in one embodiment, sample position memory 354 may generate a sequence of random offsets to compute sample positions for draw process 352, and may subsequently regenerate the same sequence of random offsets to compute the same sample positions for sample-to-pixel calculation process 360. In other words, the unfolding of the random number table may be repeatable. Thus, it may not be necessary to store sample positions at the time of their generation for draw process 352.

As shown in FIGS. 6A and 6B, the sample position information may be stored in a separate sample position memory 354. For example, the sample position information (e.g., offsets that are added to regular grid positions to form the sample positions) may be pre-determined or pre-computed using one of the above schemes and read from the sample position memory 354 (e.g., a RAM/ROM table) during rendering. The sample positions may be pre-computed by the graphics processor 90, by the host CPU, or by other logic as noted above. Alternatively, the graphics processor 90 may generate the sample position information during rendering and store the sample position information In one embodiment, sample position memory 354 may comprise a RAM/ROM that contains stochastic sample points (or locations) for different total sample counts per bin. As used herein, the term "bin" refers to a region or area in screen-space and contains however many samples are in that area (e.g., the bin may be 1×1 pixels in area, 2×2 pixels in area, etc.). The use of bins may simplify the storage and access of samples in sample buffer 162. A number of different bin sizes may be used (e.g., one sample per bin, four samples per bin, etc.). In the preferred embodiment, each bin has an xy-position that corresponds to a particular location on the display. The bins are preferably regularly spaced. In this embodiment, the bins' xy-positions may be determined from the bin's storage location within sample buffer 162. The bins' positions correspond to particular positions on the display. In some embodiments, the bin positions may correspond to pixel centers, while in other embodiments the bin positions correspond to points that are located between pixel centers. The specific position of each sample within a bin may be determined by looking up the sample's offset in the RAM/ROM table (the offsets may be stored relative to the corresponding bin position). However, depending upon the implementation, not all bin sizes may have a unique RAM/ROM entry. Some bin sizes may simply read a subset of the larger bin sizes' entries. In one embodiment, each supported size has at least four different sample-position scheme variants, which may reduce final image artifacts due to repeating sample positions.

In one embodiment, position memory 354 may store pairs of 6-bit numbers, each pair comprising an x-offset and a y-offset (other possible offsets are also possible, e.g., a time offset, a z-offset, etc.). When added to a bin position, each pair defines a particular position in screen space. The term "screen space" refers generally to the coordinate system of the display device. To improve read times, memory 354 may be constructed in a wide/parallel manner so as to allow the memory to output more than one sample location per clock cycle.

Once the sample positions have been read from sample position memory 354, draw process 352 selects the sample positions that fall within the polygon currently being rendered. Draw process 352 then calculates the z and color information (which may include alpha or other depth of field information values) for each of these samples and stores the data into sample buffer 162. In one embodiment, the sample buffer may only single-buffer z values (and perhaps alpha values) while double buffering other sample components such as color. Unlike prior art systems, graphics system 112 may double buffer all samples (although not all sample components may be double-buffered, i.e., the samples may have components that are not double-buffered, or not all samples may be double-buffered). In one embodiment, the samples are stored into sample buffer 162 in bins. In some embodiments, the size of bins, i.e., the quantity of samples within a bin, may vary from frame to frame and may also vary across different regions of display device 84 within a single frame. For example, bins along the edges of display device may comprise only one sample, while bins corresponding to pixels near the center of display device 84 may comprise sixteen samples. Note the area of bins may vary from region to region. The use of bins will be described in greater detail below in connection with FIG. 11.

In parallel and independently of draw process 352, filter process 360 is configured to read samples from sample buffer 162, filter (i.e., filter) them, and then output the resulting output pixel to display device 84. Sample-to-pixel calculation units 170 implement filter process 380. Thus, for at least a subset of the output pixels, the filter process is operable to filter a plurality of samples to produce a respective output pixel. In one embodiment, filter process 360 is configured to: (i) determine the distance from each sample to the center of the output pixel being filtered; (ii) multiply the sample's components (e.g., color and alpha) with a filter value that is a specific (programmable) function of the distance; (iii) sum all the weighted samples that contribute to the output pixel, and (iv) normalize the resulting output pixel. The filter process 360 is described in greater detail below (see description accompanying FIGS. 11, 12, and 14). Note the extent of the filter need not be circular (i.e., it may be a function of x and y instead of the distance), but even if the extent is, the filter need not be circularly symmetrical. The filter's "extent" is the area within which samples can influence the particular pixel being calculated with the filter.

Figure 7:
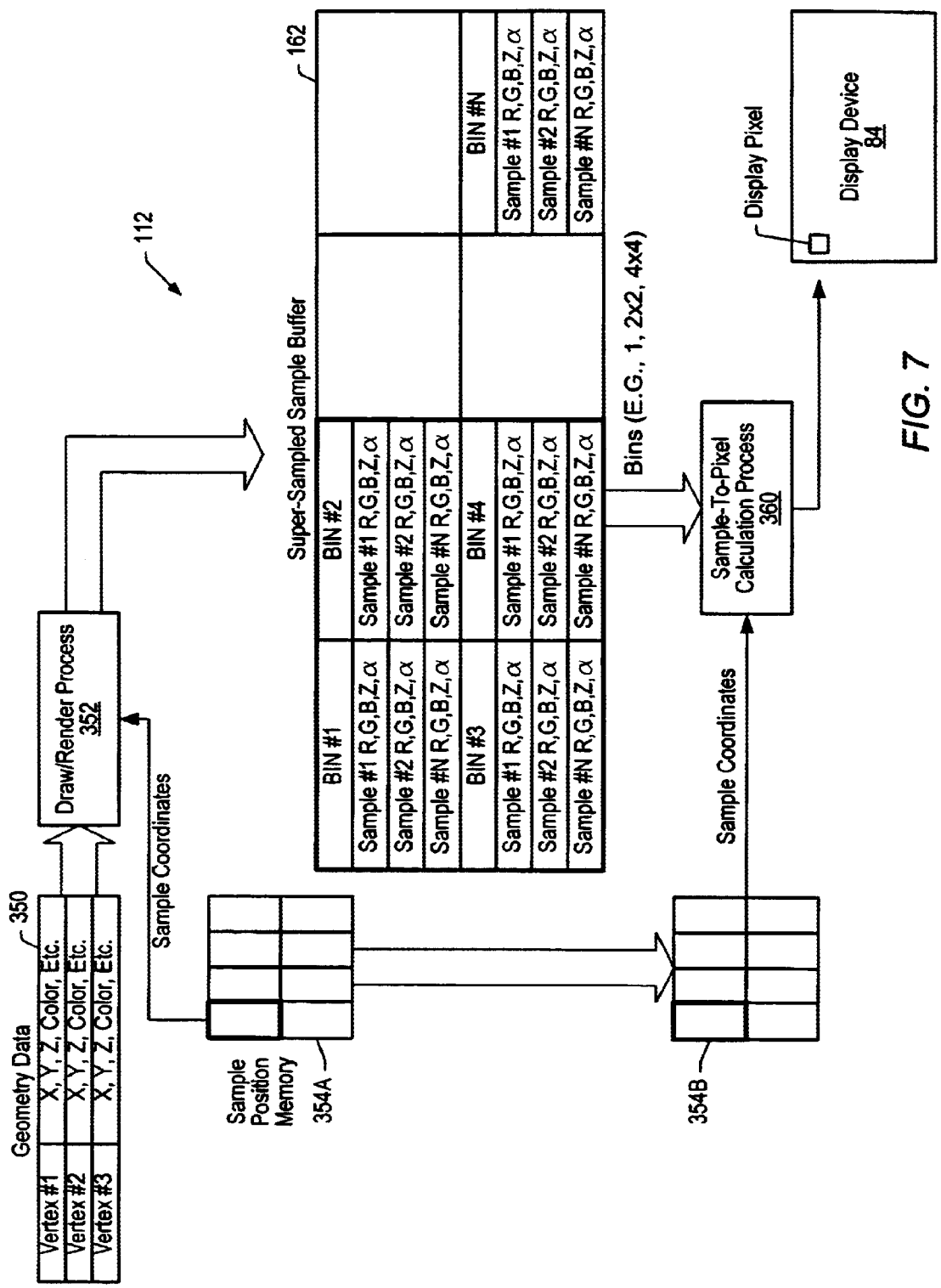
FIG. 7 is a diagram illustrating details of another embodiment of a graphics system having one embodiment of a variable resolution super-sampled sample buffer.

Turning now to FIG. 7, a diagram illustrating an alternate embodiment of graphics system 112 is shown. In this embodiment, two or more sample position memories 354A and 354B are utilized. Thus, the sample position memories 354A–B are essentially double-buffered. If the sample positions are kept the same from frame to frame, then the sample positions may be single buffered. However, if the sample positions may vary from frame to frame, then graphics system 112 may be advantageously configured to double-buffer the sample positions. The sample positions may be double buffered on the rendering side (i.e., memory 354A may be double buffered) and or the filter/convolve side (i.e., memory 354B may be double buffered). Other combinations are also possible. For example, memory 354A may be single-buffered, while memory 354B is doubled buffered. This configuration may allow one side of memory 354B to be used for refreshing (i.e., by filter/convolve process 360) while the other side of memory 354B is used being updated. In this configuration, graphics system 112 may change sample position schemes on a per-frame basis by shifting the sample positions (or offsets) from memory 354A to double-buffered memory 354B as each frame is rendered. Thus, the positions used to calculate the samples (read from memory 354A) are copied to memory 354B for use during the filtering process (i.e., the sample-to-pixel conversion process). Once the position information has been copied to memory 354B, position memory 354A may then be loaded with new sample position offsets to be used for the second frame to be rendered. In this way the sample position information follows the samples from the draw/render process to the filter process.

Yet another alternative embodiment may store tags to offsets with the samples themselves in super-sampled sample buffer 162. These tags may be used to look-up the offset/perturbation associated with each particular sample.

Sample Positioning Schemes

Figure 8:
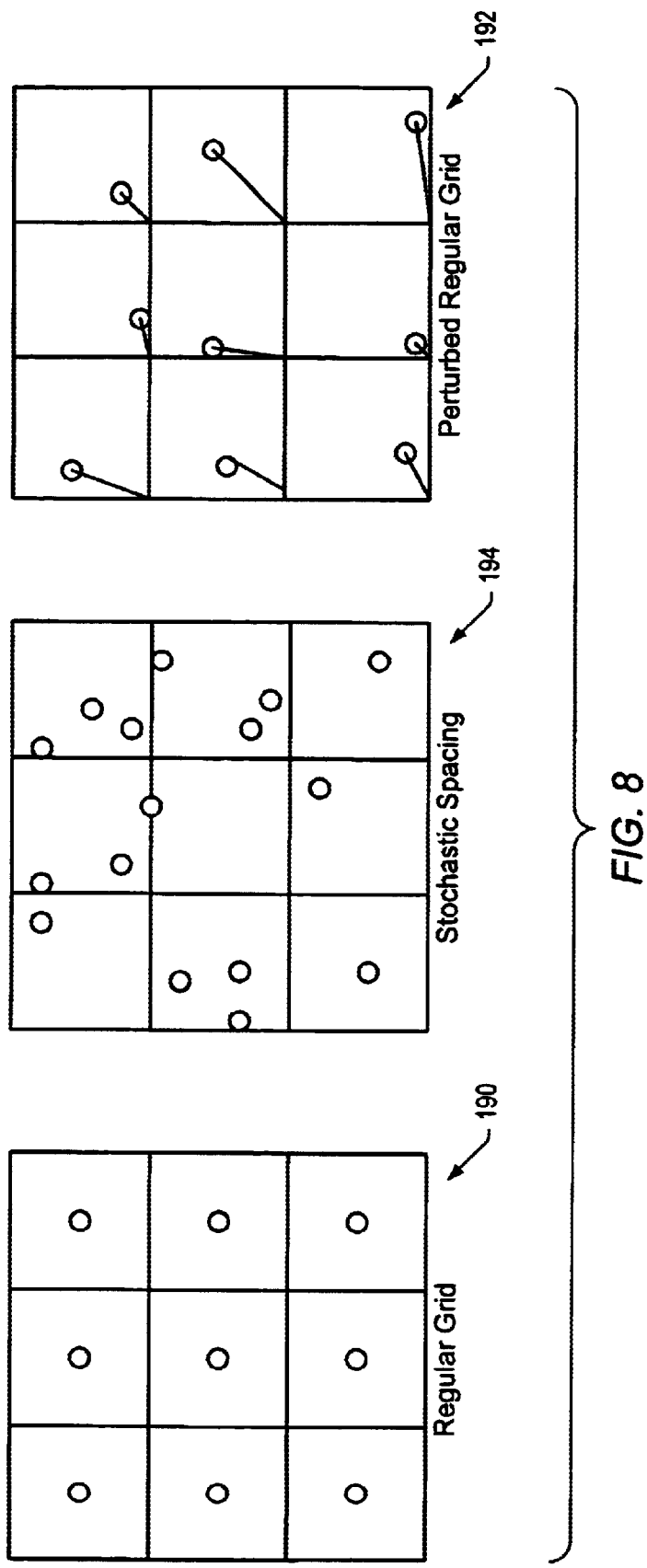
FIG. 8 is a diagram illustrating details of three different embodiments of sample positioning schemes.

FIG. 8 illustrates a number of different sample positioning schemes. In regular grid positioning scheme 190, each sample is positioned at an intersection of a regularly-spaced grid. Note however, that as used herein the term "regular grid" is not limited to square grids. Other types of grids are also considered "regular" as the term is used herein, including, but not limited to, rectangular grids, hexagonal grids, triangular grids, logarithmic grids, and semi-regular lattices such as Penrose tiling.

Perturbed regular grid positioning scheme 192 is based upon the previous definition of a regular grid. However, the samples in perturbed regular grid scheme 192 may be offset from their corresponding grid intersection. In one embodiment, the samples may be offset by a random angle (e.g., from 0° to 360°) and a random distance, or by random x and y offsets which may or may not be limited to a predetermined range. The offsets may be generated in a number of ways, e.g., by hardware based upon a small number of seeds, looked up from a table, or by using a pseudo-random function. Once again, perturbed regular gird scheme 192 may be based on any type of regular grid (e.g., square, or hexagonal). A rectangular or hexagonal perturbed grid may be particularly desirable due to the geometric properties of these grid types.

Stochastic sample positioning scheme 194 represents a third potential type of scheme for positioning samples. Stochastic sample positioning involves randomly distributing the samples across a region (e.g., the displayed region on a display device or a particular window). Random positioning of samples may be accomplished through a number of different methods, e.g., using a random number generator such as an internal clock to generate pseudo-random numbers. Random numbers or positions may also be pre-calculated and stored in memory.

Figure 9:
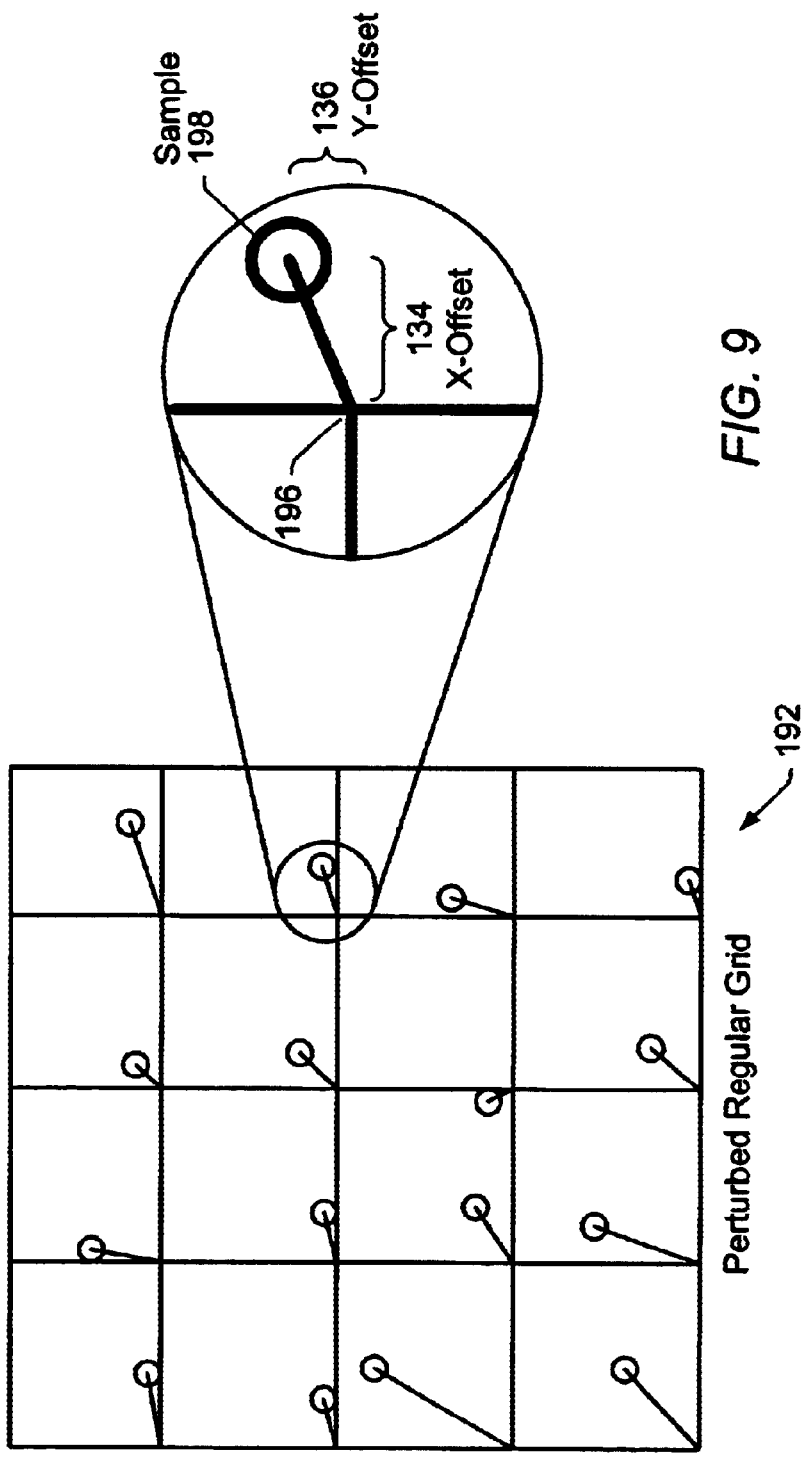
FIG. 9 is a diagram illustrating details of one embodiment of a sample positioning scheme.

Turning now to FIG. 9, details of one embodiment of perturbed regular grid scheme 192 are shown. In this embodiment, samples are randomly offset from a regular square grid by x- and y-offsets. As the enlarged area shows, sample 198 has an x-offset 134 that specifies its horizontal displacement from its corresponding grid intersection point 196. Similarly, sample 198 also has a y-offset 136 that specifies its vertical displacement from grid intersection point 196. The random off'set may also be specified by an angle and distance. As with the previously disclosed embodiment that utilized angles and distances, x-offset 134 and y-offset 136 may be limited to a particular minimum and or maximum value or range of values.

Figure 10:
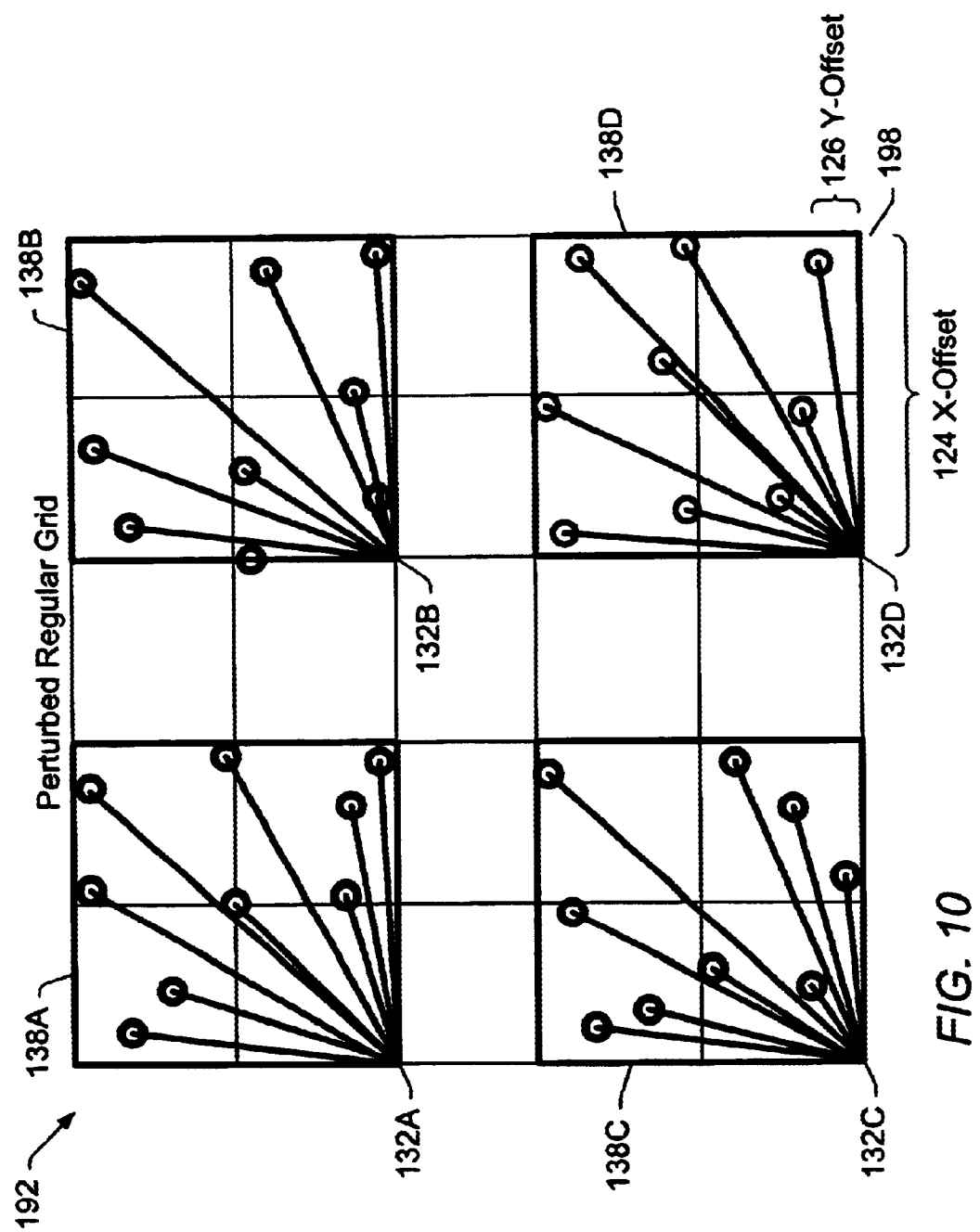
FIG. 10 is a diagram illustrating details of another embodiment of a sample positioning scheme.

Turning now to FIG. 10, details of another embodiment of perturbed regular grid scheme 192 are shown. In this embodiment, the samples are grouped into "bins" 138A–D. In this embodiment, each bin comprises nine (i.e., 3×3) samples. Different bin sizes may be used in other embodiments (e.g., bins storing 2×2 samples or 4×4 samples). In the embodiment shown, each sample's position is determined as an offset relative to the position of the bin. The position of the bins may be defined as any convenient position related to the grid, e.g., the lower left-hand corners 132A–D as shown in the figure. For example, the position of sample 198 is determined by summing x-offset 124 and y-offset 126 to the x and y coordinates of the corner 132D of bin 138D. As previously noted, this may reduce the size of the sample position memory used in some embodiments.

Figure 11:
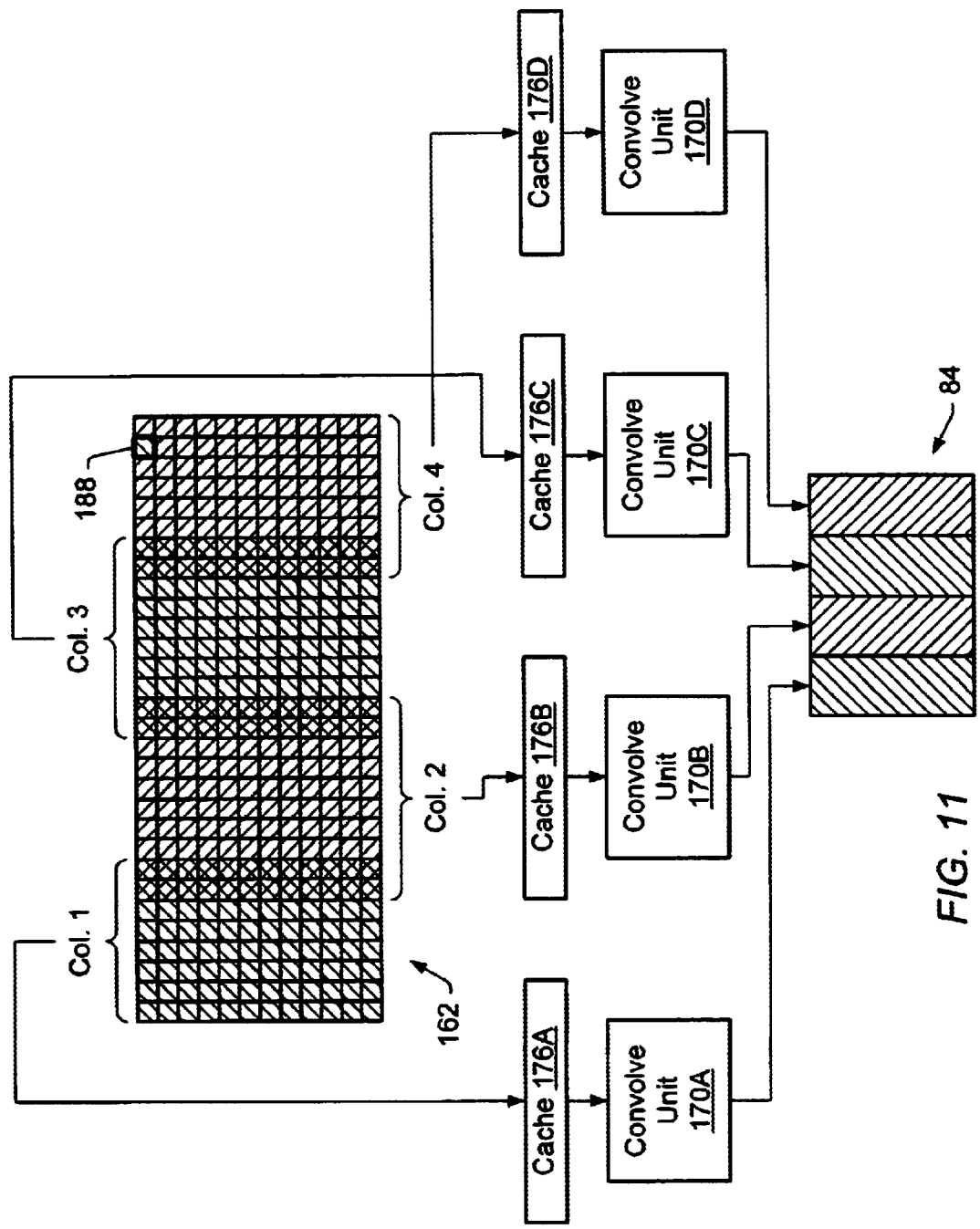
FIG. 11 is a diagram illustrating details of method of converting samples to pixels in parallel.

Turning now to FIG. 11, one possible method for rapidly converting samples stored in sample buffer 162 into pixels is shown. In this embodiment, the contents of sample buffer 162 are organized into columns (e.g., Cols. 1–4). Each column in sample buffer 162 may comprise a two-dimensional array of bins. The columns may be configured to horizontally overlap (e.g., by one or more bins), and each column may be assigned to a particular sample-to-pixel calculation unit 170A–D for the convolution process. The amount of the overlap may depend upon the extent of the filter being used. The example shown in the figure illustrates an overlap of two bins (each square such as square 188 represents a single bin comprising one or more samples). Advantageously, this configuration may allow sample-to-pixel calculation units 170A–D to work independently and in parallel, with each sample-to-pixel calculation unit 170A–D receiving and converting its own column. Overlapping the columns will eliminate visual bands or other artifacts appearing at the column boundaries for any operators larger than a pixel in extent.

Figure 11A:
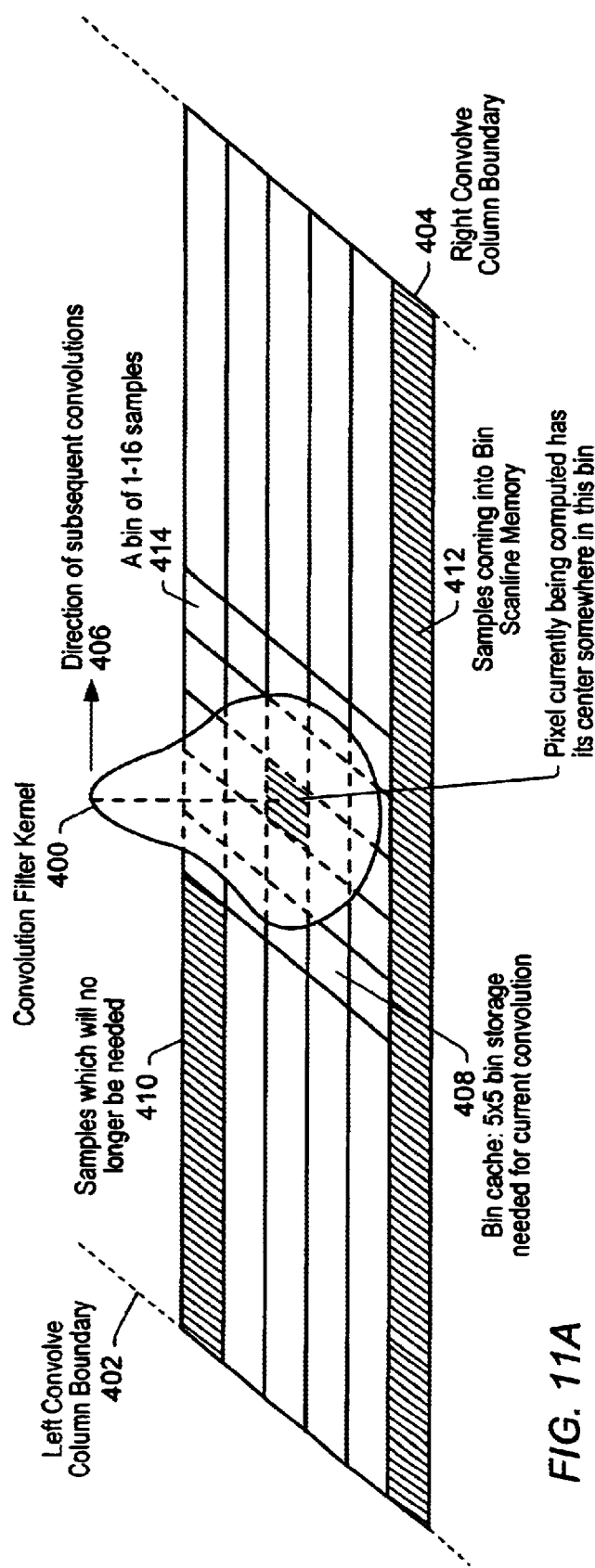
FIG. 11A is a diagram illustrating more details of the embodiment from FIG. 11.

Turning now to FIG. 11A, more details of one embodiment of a method for reading the samples from a super-sampled sample buffer are shown. As the figure illustrates, the convolution filter kernel 400 travels across column 414 (see arrow 406) to generate output pixels. One or more sample-to-pixel calculation units 170 may implement the convolution filter kernel 400. A bin cache 408 may used to provide quick access to the samples that may potentially contribute to the output pixel. As the convolution process proceeds, bins are read from the super-sampled sample buffer and stored in bin cache 408. In one embodiment, bins that are no longer needed 410 are overwritten in the cache by new bins 412. As each pixel is generated, convolution filter kernel 400 shifts. Kernel 400 may be visualized as proceeding in a sequential fashion within the column in the direction indicated by arrow 406. When kernel 400 reaches the end of the column, it may shift down one or more rows of samples and then proceed again. Thus the convolution process proceeds in a scan line manner, generating one column of output pixels for display.

Figure 11B:
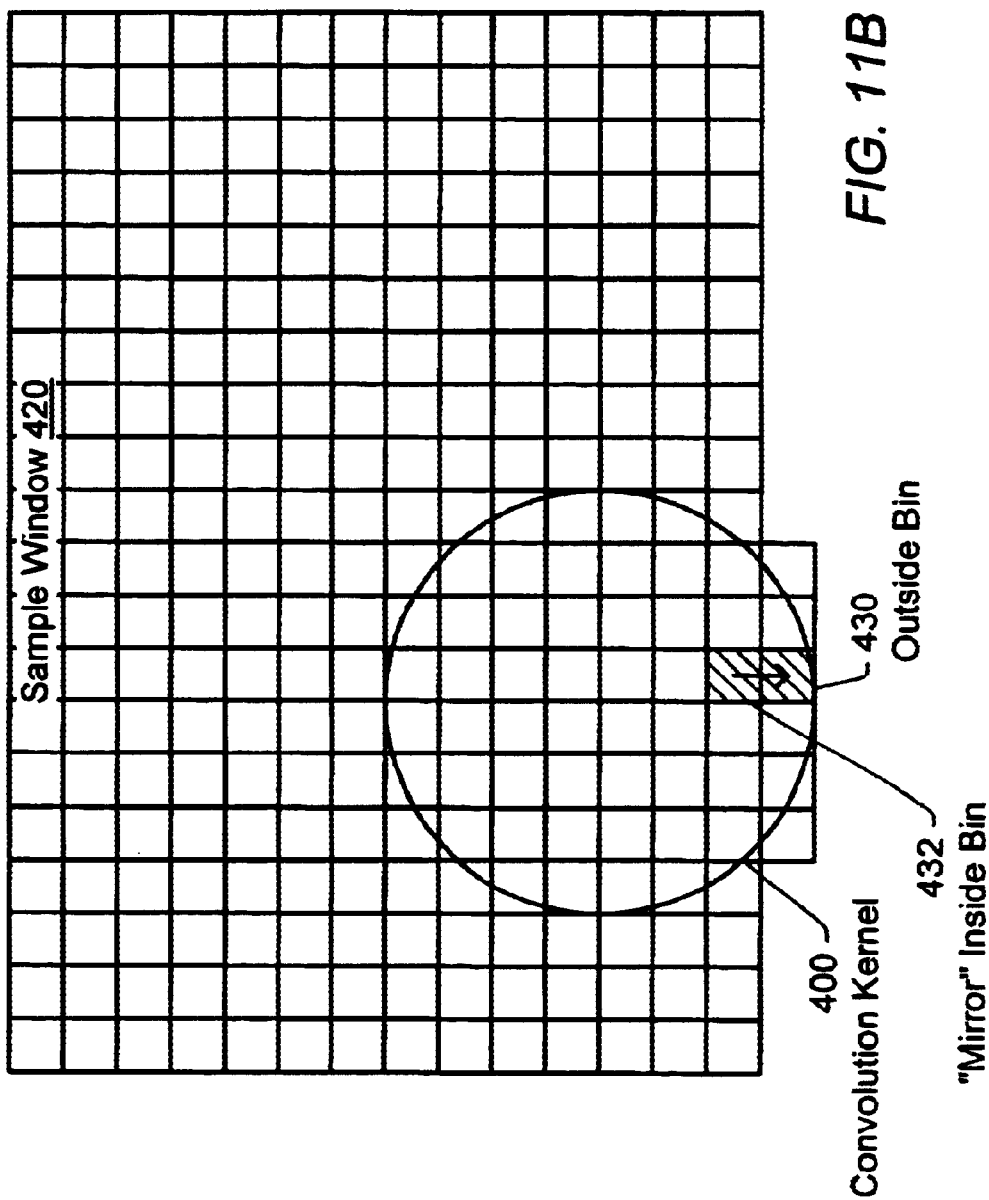
FIG. 11B is a diagram illustrating details of one embodiment of a method for dealing with boundary conditions.

Turning now to FIG. 11B, a diagram illustrating potential border conditions is shown. In one embodiment, the bins that fall outside of sample window 420 may be replaced with samples having predetermined background colors specified by the user. In another embodiment, bins that fall outside the window are not used by setting their weighting factors to zero (and then dynamically calculating normalization coefficients). In yet another embodiment, the bins at the inside edge of the window may be duplicated to replace those outside the window. This is indicated by outside bin 430 being replaced by mirror inside bin 432.

Figure 12:
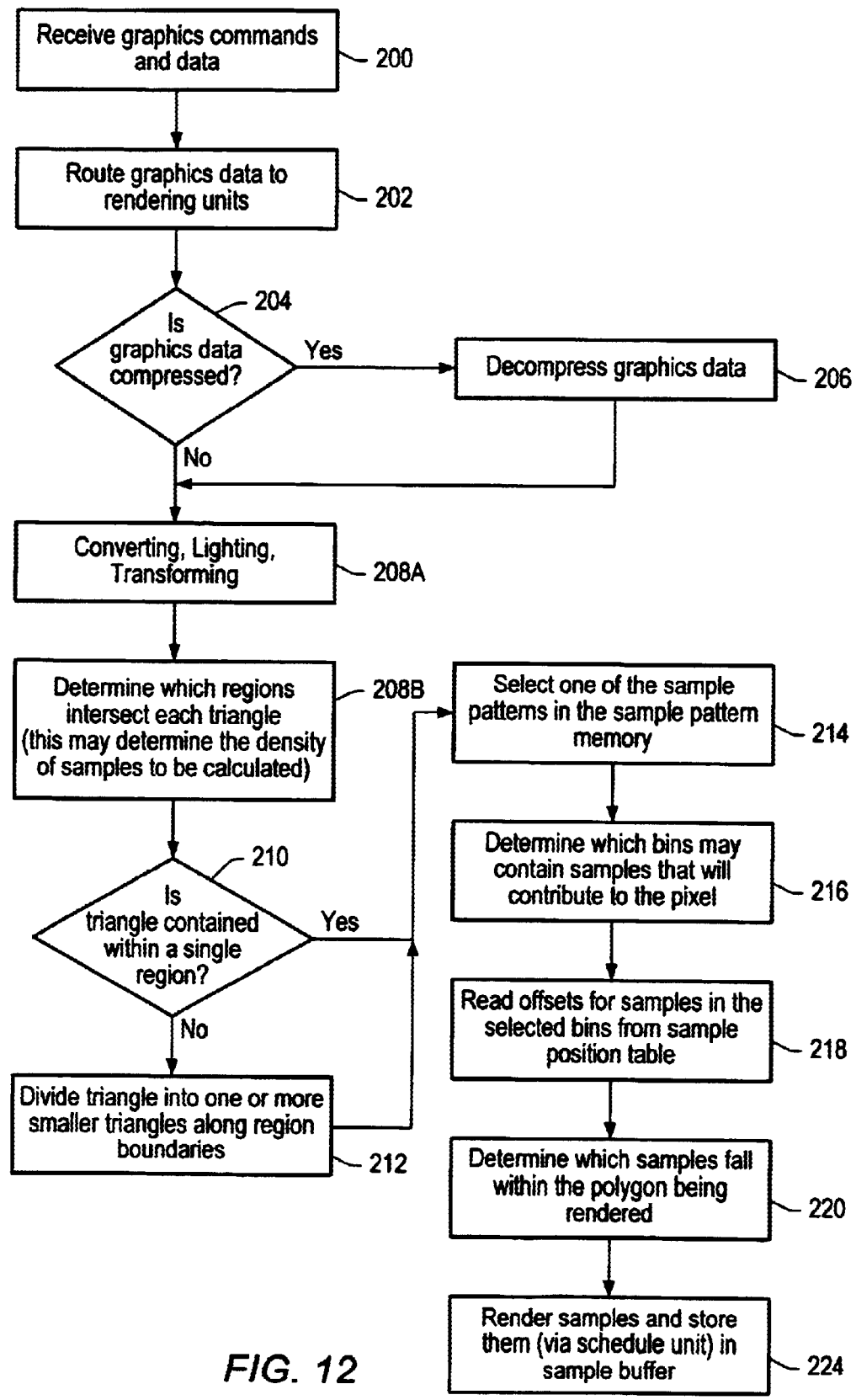
FIG. 12 is a flowchart illustrating one embodiment of a method for drawing samples into a super-sampled sample buffer.

FIG. 12 is a flowchart of one embodiment of a method for drawing or rendering sample pixels into a super-sampled sample buffer. Certain of the steps of FIG. 12 may occur concurrently or in different orders. In this embodiment, the graphics system receives graphics commands and graphics data from the host CPU 102 or directly from main memory 106 (step 200). Next, the instructions and data are routed to one or more rendering units 150A–D (step 202). If the graphics data is compressed (step 204), then the rendering units 150A–D decompress the data into a useable format, e.g., triangles (step 206). Next, the triangles are processed, e.g., converted to screen space, lit, and transformed (step 208A). If the graphics system implements variable resolution super sampling, then the triangles are compared with the sample density region boundaries (step 208B). In variable-resolution super-sampled sample buffer implementations, different regions of the display device may be allocated different sample densities based upon a number of factors (e.g., the center of the attention on the screen as determined by eye or head tracking). Sample density regions are described in greater detail below (see section entitled Variable Resolution Sample buffer below). If the triangle crosses a region boundary (step 210), then the triangle may be divided into two smaller polygons along the region boundary (step 212). This may allow each newly formed triangle to have a single sample density. In one embodiment, the graphics system may be configured to simply use the entire triangle twice (i.e., once in each region) and then use a bounding box to effectively clip the triangle.

Next, one of the sample position schemes (e.g., regular grid, perturbed regular grid, or stochastic) are selected from the sample position memory 184 (step 214). The sample position scheme will generally have been pre-programmed into the sample position memory 184, but may also be selected "on the fly". Based upon this sample position scheme and the sample density of the region containing the triangle, rendering units 150A–D determine which bins may contain samples located within the triangle's boundaries (step 216). The offsets for the samples within these bins are then read from sample position memory 184 (step 218). Each sample's position is then calculated using the offsets and is compared with the triangle's vertices to determine if the sample is within the triangle (step 220). Step 220 is discussed in greater detail below.

For each sample, that is determined to be within the triangle, the rendering unit draws the sample by calculating the sample's color, alpha and other attributes. This may involve lighting calculation and interpolation based upon the color and texture map information associated with the vertices of the triangle. Once the sample is rendered, it may be forwarded to schedule unit 154, which then stores the sample in sample buffer 162 (step 224).

Note the embodiment of the method described above is used for explanatory purposes only and is not meant to be limiting. For example, in some embodiments the steps shown in the figure as occurring serially may be implemented in parallel. Furthermore, some steps may be reduced or eliminated in certain embodiments of the graphics system (e.g., steps 204–206 in embodiments that do not implement geometry compression or steps 210–212 in embodiments that do not implement a variable resolution super-sampled sample buffer).

Determination of Which Samples Reside Within the Polygon Being Rendered

The comparison may be performed in a number of different ways. In one embodiment, the deltas between the three vertices defining the triangle are first determined. For example, these deltas may be taken in the order of first to second vertex (v2−v1)=d12, second to third vertex (v3−v2)=d23, and third vertex back to the first vertex (v1−v3)=d31. These deltas form vectors, and each vector may be categorized as belonging to one of the four quadrants of the coordinate plane (e.g., by using the two sign bits of its delta X and Y coefficients). A third condition may be added determining whether the vector is an X-major vector or Y-major vector. This may be determined by calculating whether abs(delta_x) is greater than abs(delta_y).

Figure 12A:
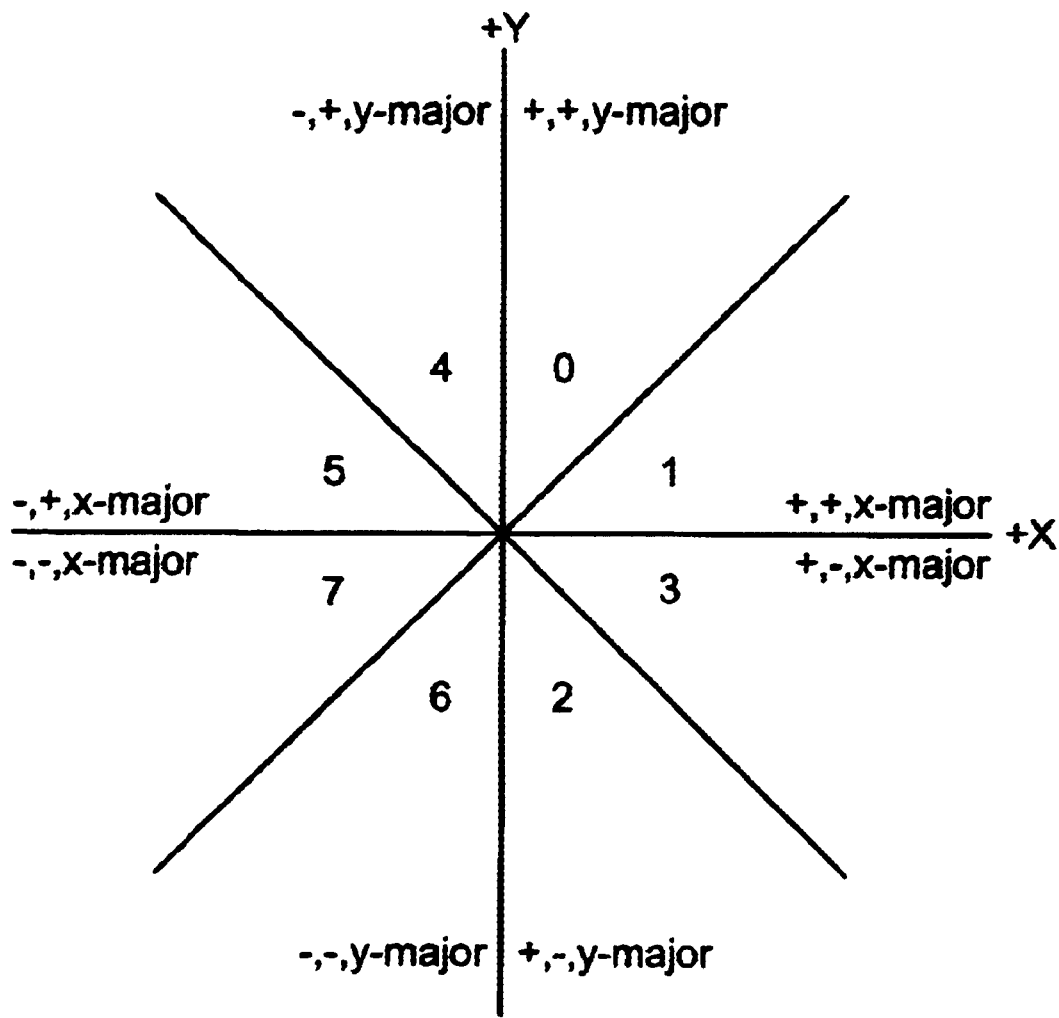
FIG. 12A is a diagram illustrating one embodiment for coding triangle vertices.

Using these three bits of information, the vectors may each be categorized as belonging to one of eight different regions of the coordinate plane. If three bits are used to define these regions, then the X-sign bit (shifted left by two), the Y-sign bit (shifted left by one), and the X-major bit, may be used to create the eight regions as shown in FIG. 12A.

Next, three edge equations may be used to define the inside portion of the triangle. These edge equations (or half-plane equations) may be defined using slope-intercept form. To reduce the numerical range needed, both X-major and Y-major equation forms may be used (such that the absolute value of the slope value may be in the range of 0 to 1). Thus, She two edge equations are:

$X$-major: $y-m \cdot x-b<0$, when the point is below the line $Y$-major: $x-m \cdot y-b<0$, when the point is to the left of the line The X-major equations produces a negative versus positive value when the point in question is below the line, while the Y-major equation produces a negative versus positive value when the point in question is to the left of the line. Since which side of the line is the "accept" side is known, the sign bit (or the inverse of the sign bit) of the edge equation result may be used to determine whether the sample is on the "accept" side or not. This is referred to herein as the "accept bit". Thus, a sample is on the accept side of a line if:

$X$-major: $(y-m \cdot x-b<0)<x$ or $>$accept $Y$-major: $(x-m \cdot y-b<0)<x$ or $>$accept The accept bit may be calculated according to the following table, wherein cw designates whether the triangle is clockwise (cw=1) or counter-clockwise (cw=0):

1: accept=!cw
0: accept=cw
4: accept=cw
5: accept=cw
7: accept=cw
6: accept=!cw
2: accept=!cw
3: accept=!cw Tie breaking rules for this representation may also be implemented (e.g., coordinate axes may be defined as belonging to the positive octant). Similarly, X-major may be defined as owning all points that tie on the slopes.

In an alternate embodiment, the accept side of an edge may be determined by applying the edge equation to the third vertex of the triangle (the vertex that is not one of the two vertices forming the edge). This method may incur the additional cost of a multiply-add, which may not be used by the technique described above.

To determine the "faced-ness" of a triangle (i.e., whether the triangle is clockwise or counter-clockwise), the delta-directions of two edges of the triangle may be checked and the slopes of the two edges may be compared. For example, assuming that edge12 has a delta-direction of 1 and the second edge (edge23) has a delta-direction of 0, 4, or 5, then the triangle is counter-clockwise. If, however, edge23 has a delta-direction of 3, 2, or 6, then the triangle is clockwise. If edge23 has a delta-direction of 1 (i.e., the same as edge12), then comparing the slopes of the two edges breaks the tie (both are x-major). If edge 12 has a greater slope, then the triangle is counter-clockwise. If edge23 has a delta-direction of 7 (the exact opposite of edge 12), then again the slopes are compared, but with opposite results in terms of whether the triangle is clockwise or counter-clockwise.

The same analysis can be exhaustively applied to all combinations of edge12 and edge23 delta-directions, in every case determining the proper faced-ness. If the slopes are the same in the tie case, then the triangle is degenerate (i.e., with no interior area). It can be explicitly tested for and culled, or, with proper numerical care, it could be let through as it will cause no pixels to render. One special case is when a triangle splits the view plane, but that may be detected earlier in the pipeline (e.g., when front plane and back plane clipping are performed).

Note in most cases only one side of a triangle is rendered. Thus, after the faced-ness of a triangle is determined, if the face is the one to be rejected, then the triangle can be culled (i.e., subject to no further processing with no pixels generated). Further note that this determination of faced-ness only uses one additional comparison (i.e., of the slope of edge 12 to that of edge23) beyond factors already computed. Many traditional approaches may utilize more complex computation (though at earlier stages of the set-up computation).

Figure 13:
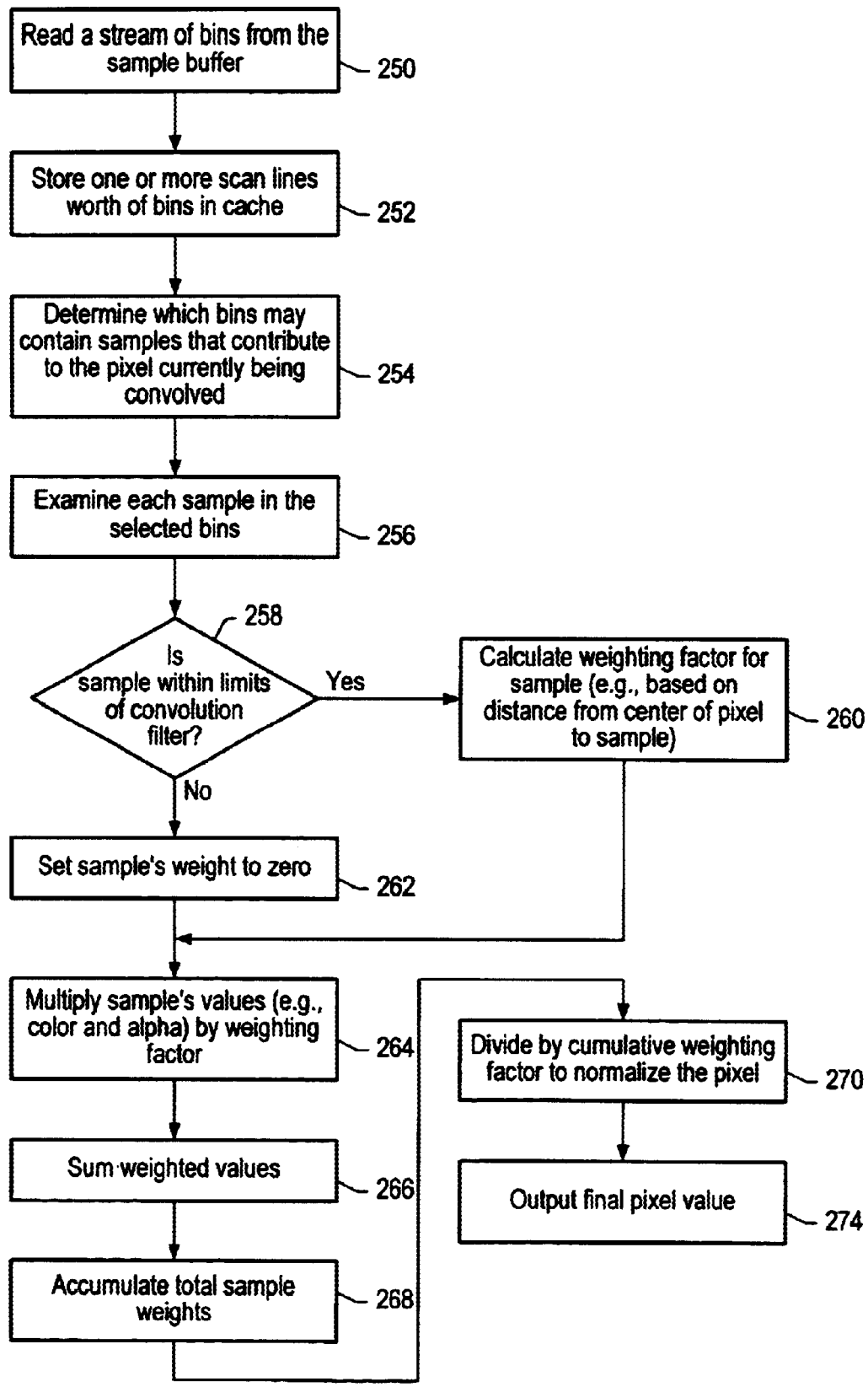
FIG. 13 is a diagram illustrating one embodiment of a method for calculating pixels from samples.

FIG. 13 is a flowchart of one embodiment of a method for filtering samples stored in the super-sampled sample buffer to generate output pixels. First, a stream of bins are read from the super-sampled sample buffer (step 250). These may be stored in one or more caches to allow the sample-to-pixel calculation units 170 easy access during the convolution process (step 252). Next, the bins are examined to determine which may contain samples that contribute to the output pixel currently being generated by the filter process (step 254). Each sample that is in a bin that may contribute to the output pixel is then individually examined to determine if the sample does indeed contribute (steps 256–258). This determination may be based upon the distance from the sample to the center of the output pixel being generated.

In one embodiment, the sample-to-pixel calculation units 170 may be configured to calculate this distance (i.e; the extent of the filter at sample's position) and then use it to index into a table storing filter weight values according to filter extent (step 260). In another embodiment, however, the potentially expensive calculation for determining the distance from the center of the pixel to the sample (which typically involves a square root function) is avoided by using distance squared to index into the table of filter weights. Alternatively, a function of x and y may be used in lieu of one dependent upon a distance calculation. In one embodiment, this may be accomplished by utilizing a floating point format for the distance (e.g., four or five bits of mantissa and three bits of exponent), thereby allowing much of the accuracy to be maintained while compensating for the increased range in values. In one embodiment, the table may be implemented in ROM. However, RAM tables may also be used. Advantageously, RAM tables may, in some embodiments, allow the graphics system to vary the filter coefficients on a per-frame basis. For example, the filter coefficients may be varied to compensate for known shortcomings of the display or for the user's personal preferences. The graphics system can also vary the filter coefficients on a screen area basis within a frame, or on a per-output pixel basis. Another alternative embodiment may actually calculate the desired filter weights for each sample using specialized hardware (e.g., multipliers and adders). The filter weight for samples outside the limits of the convolution filter may simply be multiplied by a filter weight of zero (step 262), or they may be removed from the calculation entirely.

Once the filter weight for a sample has been determined, the sample may then be multiplied by its filter weight (step 264). The weighted sample may then be summed with a running total to determine the final output pixel's color value (step 266). The filter weight may also be added to a running total pixel filter weight (step 268), which is used to normalize the filtered pixels. Normalization advantageously prevents the filtered pixels (e.g., pixels with more samples than other pixels) from appearing too bright or too dark by compensating for gain introduced by the convolution process. After all the contributing samples have been weighted and summed, the total pixel filter weight may be used to divide out the gain caused by the filtering (step 270). Finally, the normalized output pixel may be output for gamma correction, digital-to-analog conversion (if necessary), and eventual display (step 274).

Figure 14:
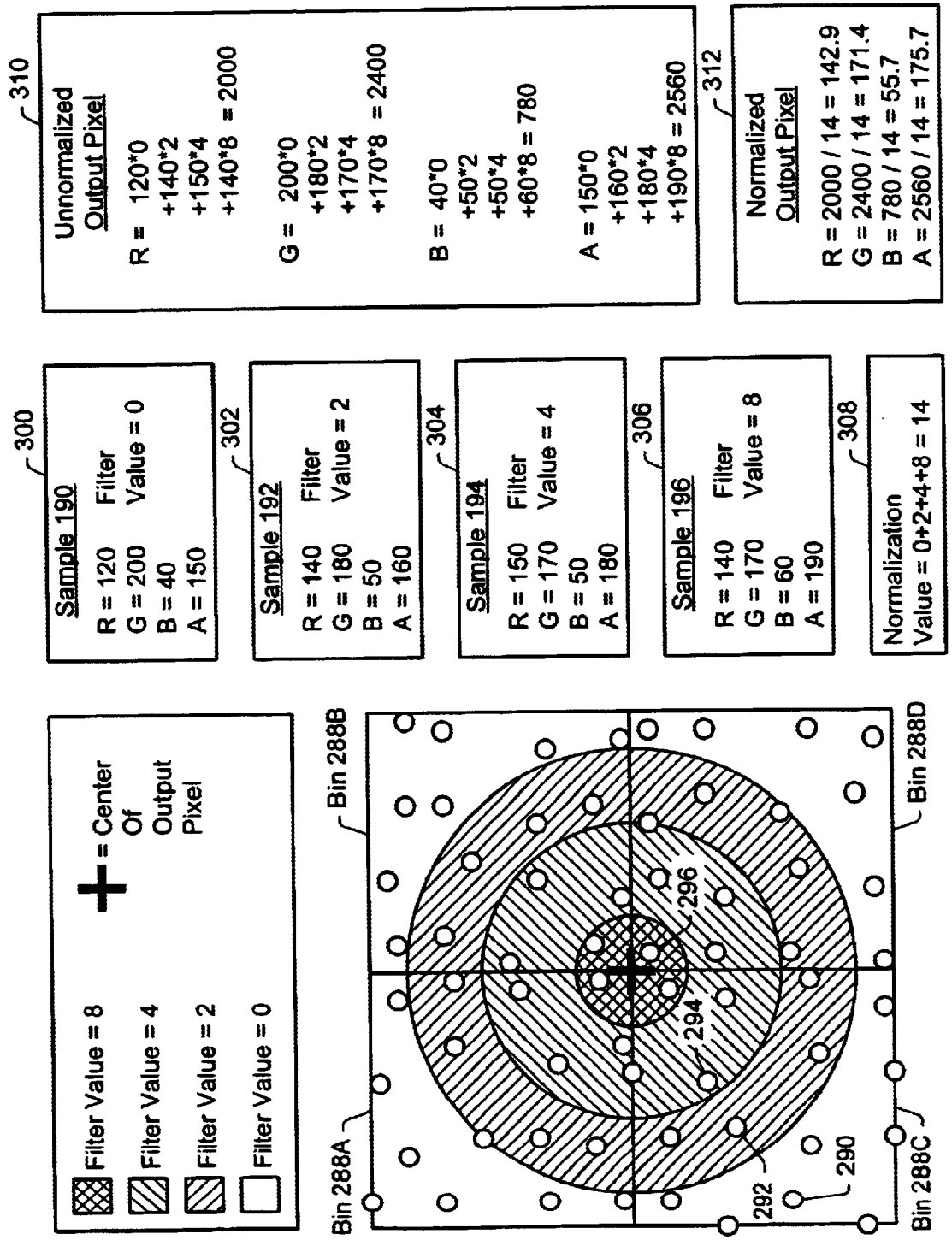
FIG. 14 is a diagram illustrating details of one embodiment of a pixel convolution for an example set of samples.

FIG. 14 illustrates a simplified example of an output pixel convolution. As the figure shows, four bins 288A–D contain samples that may possibly contribute to the output pixel. In this example, the center of the output pixel is located at the boundary of bins 288A–288D. Each bin comprises sixteen samples, and an array of 2 four bins (2×2) is filtered to generate the output pixel. Assuming circular filters are used, the distance of each sample from the pixel center determines which filter value will be applied to the sample. For example, sample 296 is relatively close to the pixel center, and thus falls within the region of the filter having a filter value of 8. Similarly, samples 294 and 292 fall within the regions of the filter having filter values of 4 and 2, respectively. Sample 290, however, falls outside the maximum filter extent, and thus receives a filter value of 0. Thus, sample 290 will not contribute to the output pixel's value. This type of filter ensures that the samples located the closest to the pixel center will contribute the most, while pixels located the far from the pixel center will contribute less to the final output pixel values. This type of filtering automatically performs anti-aliasing by smoothing any abrupt changes in the image (e.g., from a dark line to a light background). Another particularly useful type of filter for anti-aliasing is a windowed sinc filter. Advantageously, the windowed sinc filter contains negative lobes that re-sharpen some of the blended or "fuzzed" image. Negative lobes are areas where the filter causes the samples to subtract from the pixel being calculated. In contrast, samples on either side of the negative lobe add to the pixel being calculated.

Example values for samples 290–296 are illustrated in boxes 300–308. In this example, each sample comprises red, green, blue and alpha values, in addition to the sample's positional data. Block 310 illustrates the calculation of each pixel component value for the non-normalized output pixel. As block 310 indicates, potentially undesirable gain is introduced into the final pixel values (i.e., an out pixel having a red component value of 2000 is much higher than any of the sample's red component values). As previously noted, the filter values may be summed to obtain normalization value 308. Normalization value 308 is used to divide out the unwanted gain from the output pixel. Block 312 illustrates this process and the final normalized example pixel values.

The filter presented in FIG. 14 has been chosen for descriptive purposes only and is not meant to be limiting. A wide variety of filters may be used for pixel value computations depending upon the desired filtering effect(s). It is a well-known fact that the sinc filter realizes an ideal band-pass filter. However, the sinc filter takes non-zero values over the whole of the X-Y plane. Thus, various windowed approximations of the sinc filter have been developed. Some of these approximations such as the cone filter or Gaussian filter approximate only the central lobe of the sinc filter, and thus, achieve a smoothing effect on the sampled image. Better approximations such as the Mitchell-Netravali filter (including the Catmull-Rom filter as a special case) are obtained by approximating some of the negative lobes and positive lobes that surround the central positive lobe of the sinc filter. The negative lobes allow a filter to more effectively retain spatial frequencies up to the cutoff frequency and reject spatial frequencies beyond the cutoff frequency. A negative lobe is a portion of a filter where the filter values are negative. Thus, some of the samples residing in the support of a filter may be assigned negative filter values (i.e. filter weights).

A wide variety of filters may be used for the pixel value convolutions including filters such as a box filter, a tent filter, a cylinder filter, a cone filter, a Gaussian filter, a Catmull-Rom filter, a Mitchell-Netravali filter, any windowed approximation of a sinc filter, etc. Furthermore, the support of the filters used for the pixel value convolutions may be circular, elliptical, rectangular (e.g. square), triangular, hexagonal, etc.

Full-screen Anti-aliasing

The vast majority of current 3D graphics systems only provide real-time anti-aliasing for lines and dots. While some systems also allow the edge of a polygon to be "fuzzed", this technique typically works best when all polygons have been pre-sorted in depth. This may defeat the purpose of having general-purpose 3D rendering hardware for most applications (which do not depth pre-sort their polygons). In one embodiment, graphics system 112 may be configured to implement full-screen anti-aliasing by stochastically sampling up to sixteen samples per output pixel, filtered by a 5×5-convolution filter.

Variable Resolution Super Sampling

Currently, the brute force method of utilizing a fixed number of samples per pixel location, e.g., an 8× super-sampled sample buffer, would entail the use of eight times more memory, eight times the fill rate (i.e., memory bandwidth), and a convolution pipe capable of processing eight samples per pixel.

In one embodiment, graphics system 112 may be configured to overcome these potential obstacles by implementing variable resolution super-sampling. In this embodiment, graphics system 112 mimics the human eye's characteristics by allocating a higher number of samples per pixel at one or more first locations on the screen (e.g., the point of foveation on the screen), with a drop-off in the number of samples per pixel for one or more second locations on the screen (e.g., areas farther away from the point of foveation). Depending upon the implementation, the point of foveation may be determined in a variety of ways. In one embodiment, the point of foveation may be a predetermined area around a certain object displayed upon the screen. For example, the area around a moving cursor or the main character in a computer game may be designated the point of foveation. In another embodiment, the point of foveation on the screen may be determined by head-tracking or eye-tracking. Even if eye/head/hand-tracking, cursor-based, or main character-based points of foveation are not implemented, the point of foveation may be fixed at the center of the screen, where the majority of viewer's attention is focused the majority of the time. Variable resolution super-sampling is described in greater detail below.

Variable-resolution Super-sampled Sample Buffer—
FIGS. 15–19

A traditional frame buffer is one rectangular array of uniformly sampled pixels. For every pixel on the final display device (CRT or LCD), there is a single pixel or location of memory storage in the frame buffer (perhaps double buffered). There is a trivial one-to-one correspondence between the 2D memory address of a given pixel and its 2D sample address for the mathematics of rendering. Stated another way, in a traditional frame buffer there is no separate notion of samples apart from the pixels themselves. The output pixels are stored in a traditional frame buffer in a row/column manner corresponding to how the pixels are provided to the display during display refresh.

In a variable-resolution super-sampled sample buffer, the number of computed samples per output pixel varies on a regional basis. Thus, output pixels in regions of greater interest are computed using a greater number of samples, thus producing greater resolution in this region, and output pixels in regions of lesser interest are computed using a lesser number of samples, thus producing lesser resolution in this region.

As previously noted, in some embodiments graphic system 112 may be configured with a variable resolution super-sampled sample buffer. To implement variable resolution super-sampling, sample buffer 162 may be divided into smaller pieces, called regions. The size, location, and other attributes of these regions may be configured to vary dynamically, as parameterized by run-time registers on a per-frame basis.

Figure 15:
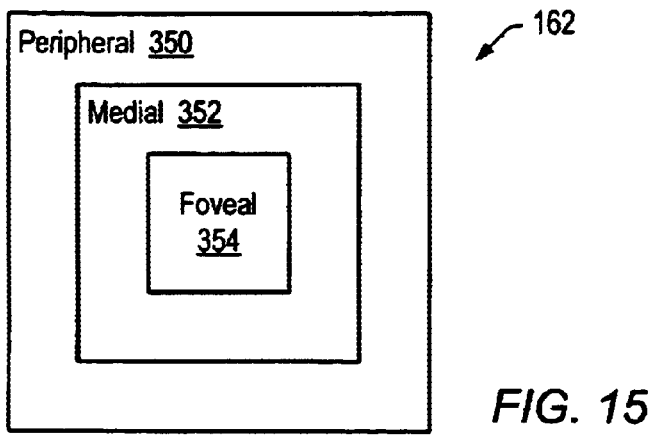
FIG. 15 is a diagram illustrating one embodiment of a method for dividing a super-sampled sample buffer into regions.

Turning now to FIG. 15, a diagram of one possible scheme for dividing sample buffer 162 is shown. In this embodiment, sample buffer 162 is divided into the following three nested regions: foveal region 354, medial region 352, and peripheral region 350. Each of these regions has a rectangular shaped outer border, but the medial and the peripheral regions have a rectangular shaped hole in their center. Each region may be configured with certain constant (per frame) properties, e.g., a constant density sample density and a constant size of pixel bin. In one embodiment, the total density range may be 256, i.e., a region could support between one sample every 16 screen pixels (4×4) and 16 samples for every 1 screen pixel. In other embodiments, the total density range may be limited to other values, e.g., 64. In one embodiment, the sample density varies, either linearly or non-linearly, across a respective region. Note in other embodiments the display may be divided into a plurality of constant sized regions (e.g., squares that are 4×4 pixels in size or 40×40 pixels in size).

Figure 16:
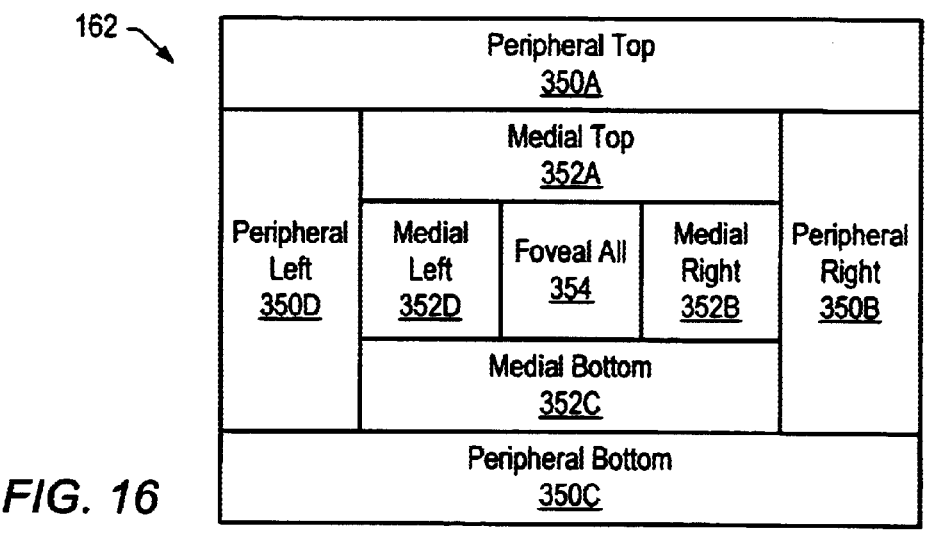
FIG. 16 is a diagram illustrating another embodiment of a method for dividing a super-sampled sample buffer into regions.

To simply perform calculations for polygons that encompass one or more region corners (e.g., a foveal region corner), the sample buffer may be further divided into a plurality of subregions. Turning now to FIG. 16, one embodiment of sample buffer 162 divided into sub-regions is shown. Each of these sub-regions are rectangular, allowing graphics system 112 to translate from a 2D address with a sub-region to a linear address in sample buffer 162. Thus, in some embodiments each sub-region has a memory base address, indicating where storage for the pixels within the sub-region starts. Each sub-region may also have a "stride" parameter associated with its width.

Figure 17:
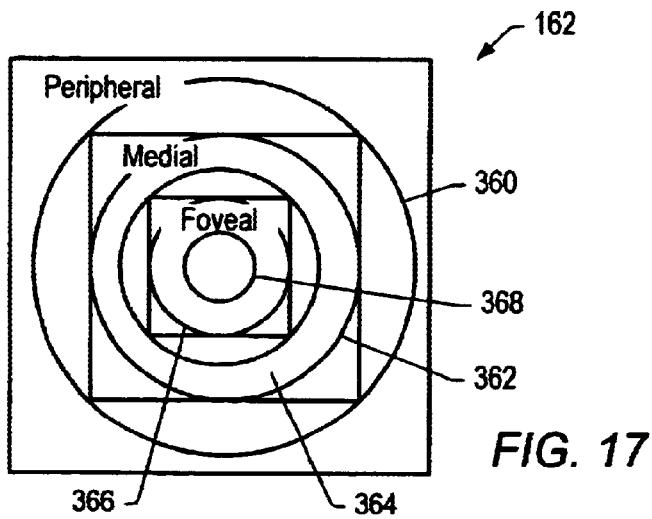
FIG. 17 is a diagram illustrating yet another embodiment of a method for dividing a super-sampled sample buffer into regions.

Another potential division of the super-sampled sample buffer is circular. Turning now to FIG. 17, one such embodiment is illustrated. For example, each region may have two radii associated with it (i.e., 360–368), dividing the region into three concentric circular-regions. The circular-regions may all be centered at the same screen point, the fovea center point. Note however, that the fovea center-point need not always be located at the center of the foveal region. In some instances it may even be located off-screen (i.e., to the side of the visual display surface of the display device). While the embodiment illustrated supports up to seven distinct circular-regions, it is possible for some of the circles to be shared across two different regions, thereby reducing the distinct circular-regions to five or less.

The circular regions may delineate areas of constant sample density actually used. For example, in the example illustrated in the figure, foveal region 354 may allocate a sample buffer density of 8 samples per screen pixel, but outside the innermost circle 368, it may only use 4 samples per pixel, and outside the next circle 366 it may only use two samples per pixel. Thus, in this embodiment the rings need not necessarily save actual memory (the regions do that), but they may potentially save memory bandwidth into and out of the sample buffer (as well as pixel convolution bandwidth). In addition to indicating a different effective sample density, the rings may also be used to indicate a different sample position scheme to be employed. As previously noted, these sample position schemes may stored in an on-chip RAM/ROM, or in programmable memory.

As previously discussed, in some embodiments super-sampled sample buffer 162 may be further divided into bins. For example, a bin may store a single sample or an array of samples (e.g., 2×2 or 4×4 samples). In one embodiment, each bin may store between one and sixteen sample points, although other configurations are possible and contemplated. Each region may be configured with a particular bin size, and a constant memory sample density as well. Note that the lower density regions need not necessarily have larger bin sizes. In one embodiment, the regions (or at least the inner regions) are exact integer multiples of the bin size enclosing the region. This may allow for more efficient utilization of the sample buffer in some embodiments.

Variable-resolution super-sampling involves calculating a variable number of samples for each pixel displayed on the display device. Certain areas of an image may benefit from a greater number of samples (e.g., near object edges), while other areas may not need extra samples (e.g., smooth areas having a constant color and brightness). To save memory and bandwidth, extra samples may be used only in areas that may benefit from the increased resolution. For example, if part of the display is colored a constant color of blue (e.g., as in a background), then extra samples may not be particularly useful because they will all simply have the constant value (equal to the background color being displayed). In contrast, if a second area on the screen is displaying a 3D rendered object with complex textures and edges, the use of additional samples may be useful in avoiding certain artifacts such as aliasing. A number of different methods may be used to determine or predict which areas of an image would benefit from higher sample densities. For example, an edge analysis could be performed on the final image, and with that information being used to predict how the sample densities should be distributed. The software application may also be able to indicate which areas of a frame should be allocated higher sample densities.

A number of different methods may be used to implement variable-resolution super sampling. These methods tend to fall into the following two general categories: (1) those methods that concern the draw or rendering process, and (2) those methods that concern the convolution process. For example, samples may be rendered into the super-sampling sample buffer 162 using any of the following methods:

a uniform sample density;

varying sample density on a per-region basis (e.g., medial, foveal, and peripheral); and varying sample density by changing density on a scan-line basis (or on a small number of scan lines basis).

Varying sample density on a scan-line basis may be accomplished by using a look-up table of densities. For example, the table may specify that the first five pixels of a particular scan line have three samples each, while the next four pixels have two samples each, and so on.

On the convolution side, the following methods are possible:

a uniform convolution filter;

continuously variable convolution filter; and a convolution filter operating at multiple spatial frequencies.

A uniform convolve filter may, for example, have a constant extent (or number of samples selected) for each pixel calculated. In contrast, a continuously variable convolution filter may gradually change the number of samples used to calculate a pixel. The function may be vary continuously from a maximum at the center of attention to a minimum in peripheral areas.

Different combinations of these methods (both on the rendering side and convolution side) are also possible. For example, a constant sample density may be used on the rendering side, while a continuously variable convolution filter may be used on the samples.

Different methods for determining which areas of the image will be allocated more samples per pixel are also contemplated. In one embodiment, if the image on the screen has a main focal point (e.g., a character like Mario in a computer game), then more samples may be calculated for the area around Mario and fewer samples may be calculated for pixels in other areas (e.g., around the background or near the edges of the screen).

In another embodiment, the viewer's point of foveation may be determined by eye/head/hand-tracking. In head-tracking embodiments, the direction of the viewer's gaze is determined or estimated from the orientation of the viewer's head, which may be measured using a variety of mechanisms. For example, a helmet or visor worn by the viewer (with eye/head tracking) may be used alone or in combination with a hand-tracking mechanism, wand, or eye-tracking sensor to provide orientation information to graphics system 112. Other alternatives include head-tracking using an infrared reflective dot placed on the user's forehead, or using a pair of glasses with head- and or eye-tracking sensors built in. One method for using head- and hand-tracking is disclosed in U.S. Pat. No. 5,446,834 (entitled "Method and Apparatus for High Resolution Virtual Reality Systems Using Head Tracked Display," by Michael Deering, issued Aug. 29, 1995), which is incorporated herein by reference in its entirety. Other methods for head tracking are also possible and contemplated (e.g., infrared sensors, electromagnetic sensors, capacitive sensors, video cameras, sonic and ultrasonic detectors, clothing based sensors, video tracking devices, conductive ink, strain gauges, force-feedback detectors, fiber optic sensors, pneumatic sensors, magnetic tracking devices, and mechanical switches).

As previously noted, eye-tracking may be particularly advantageous when used in conjunction with head-tracking. In eye-tracked embodiments, the direction of the viewer's gaze is measured directly by detecting the orientation of the viewer's eyes in relation to the viewer's head. This information, when combined with other information regarding the position and orientation of the viewer's head in relation to the display device, may allow an accurate measurement of viewer's point of foveation (or points of foveation if two eye-tracking sensors are used). One possible method for eye tracking is disclosed in U.S. Pat. No. 5,638,176 (entitled "Inexpensive Interferometric Eye Tracking System"). Other methods for eye tracking are also possible and contemplated (e.g., the methods for head tracking listed above).

Regardless of which method is used, as the viewer's point of foveation changes position, so does the distribution of samples. For example, if the viewer's gaze is focused on the upper left-hand corner of the screen, the pixels corresponding to the upper left-hand corner of the screen may each be allocated eight or sixteen samples, while the pixels in the opposite corner (i.e., the lower right-hand corner of the screen) may be allocated only one or two samples per pixel. Once the viewer's gaze changes, so does the allotment of samples per pixel. When the viewer's gaze moves to the lower right-hand corner of the screen, the pixels in the upper left-hand corner of the screen may be allocated only one or two samples per pixel. Thus the number of samples per pixel may be actively changed for different regions of the screen in relation the viewer's point of foveation. Note in some embodiments, multiple users may be each have head/eye/hand tracking mechanisms that provide input to graphics system 112. In these embodiments, there may conceivably be two or more points of foveation on the screen, with corresponding areas of high and low sample densities. As previously noted, these sample densities may affect the render process only, the filter process only, or both processes.

Figure 18A:
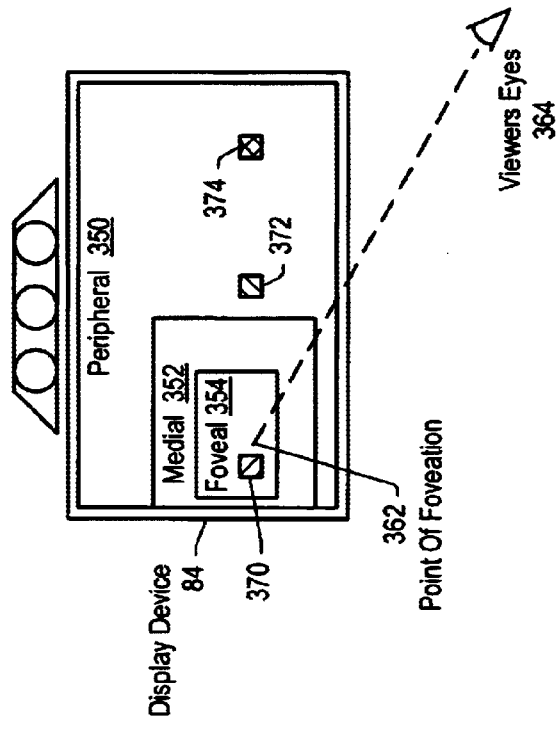
FIGS. 18A–B are diagrams illustrating one embodiment of a graphics system configured to utilize input from an eye tracking or head tracking device.
Figure 18B:
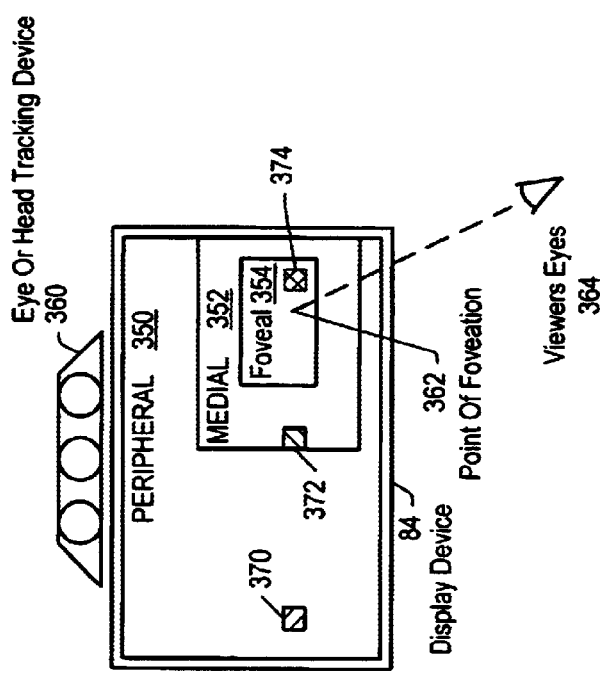

Turning now to FIGS. 18A–B, one embodiment of a method for apportioning the number of samples per pixel is shown. The method apportions the number of samples based on the location of the pixel relative to one or more points of foveation. In FIG. 18A, an eye- or head-tracking device 360 is used to determine the point of foveation 362 (i.e., the focal point of a viewer's gaze). This may be determined by using tracking device 360 to determine the direction that the viewer's eyes (represented as 364 in the figure) are facing. As the figure illustrates, in this embodiment, the pixels are divided into foveal region 354 (which may be centered around the point of foveation 362), medial region 352, and peripheral region 350.

Three sample pixels are indicated in the figure. Sample pixel 374 is located within foveal region 314. Assuming foveal region 314 is configured with bins having eight samples, and assuming the convolution radius for each pixel touches four bins, then a maximum of 32 samples may contribute to each pixel. Sample pixel 372 is located within medial region 352. Assuming medial region 352 is configured with bins having four samples, and assuming the convolution radius for each pixel touches four bins, then a maximum of 16 samples may contribute to each pixel. Sample pixel 370 is located within peripheral region 350. Assuming peripheral region 370 is configured with bins having one sample each, and assuming the convolution radius for each pixel touches one bin, then there is a one sample to pixel correlation for pixels in peripheral region 350. Note these values are merely examples and a different number of regions, samples per bin, and convolution radius may be used.

Turning now to FIG. 18B, the same example is shown, but with a different point of foveation 362. As the figure illustrates, when tracking device 360 detects a change in the position of point of foveation 362, it provides input to the graphics system, which then adjusts the position of foveal region 354 and medial region 352. In some embodiments, parts of some of the regions (e.g., medial region 352) may extend beyond the edge of display device 84. In this example, pixel 370 is now within foveal region 354, while pixels 372 and 374 are now within the peripheral region. Assuming the sample configuration as the example in FIG. 18A, a maximum of 32 samples may contribute to pixel 370, while only one sample will contribute to pixels 372 and 374. Advantageously, this configuration may allocate more samples for regions that are near the point of foveation (i.e., the focal point of the viewer's gaze). This may provide a more realistic image to the viewer without the need to calculate a large number of samples for every pixel on display device 84.

Figure 19A:
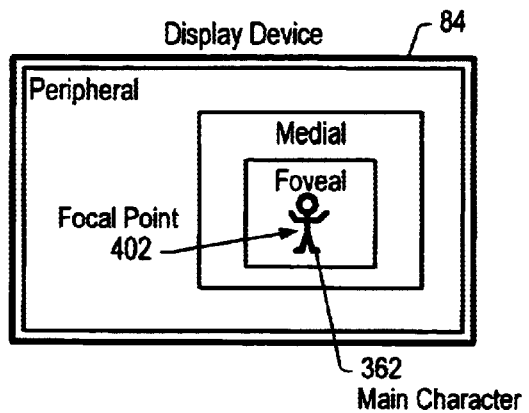
FIGS. 19A–B are diagrams illustrating one embodiment of a graphics system configured to vary region position according to the position of a cursor or visual object.
Figure 19B:
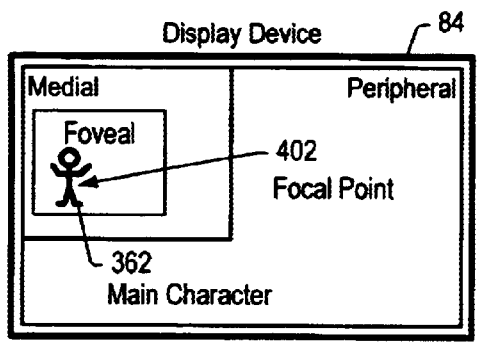

Turning now to FIGS. 19A–B, another embodiment of a computer system configured with a variable resolution super-sampled sample buffer is shown. In this embodiment, the center of the viewer's attention is determined by position of a main character 362. Medial and foveal regions are centered around main character 362 as it moves around the screen. In some embodiments main character may be a simple cursor (e.g., as moved by keyboard input or by a mouse).

In still another embodiment, regions with higher sample density may be centered around the middle of display device 84's screen. Advantageously, this may require less control software and hardware while still providing a shaper image in the center of the screen (where the viewer's attention may be focused the majority of the time).

Figure 20:
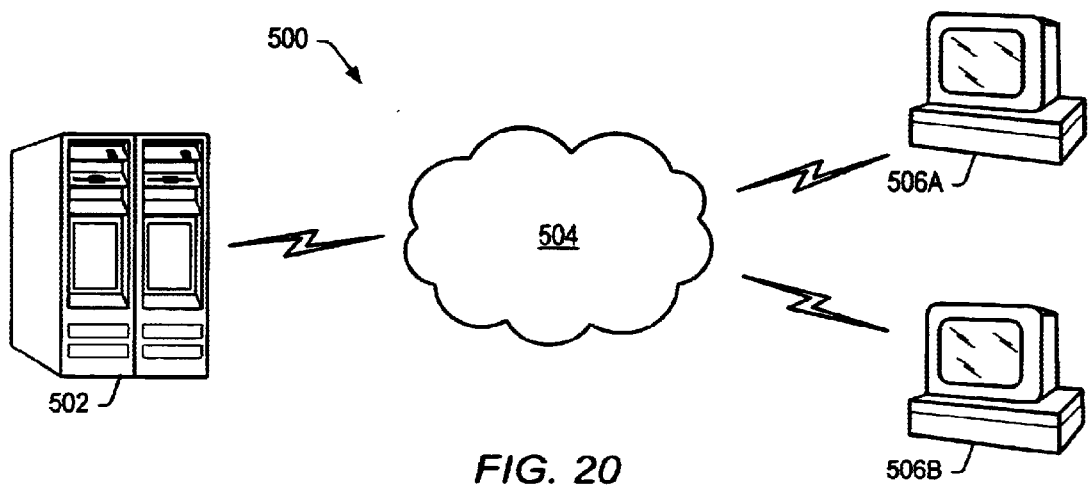
FIG. 20 is a diagram of one embodiment of a computer network connecting multiple computers.

Computer Network—FIG. 20

Referring now to FIG. 20, a computer network 500 is shown comprising at least one server computer 502 and one or more client computers 506A-N. (In the embodiment shown in FIG. 4, client computers 506A–B are depicted). One or more of the client systems may be configured similarly to computer system 80, with each having one or more graphics systems 112 as described above. Server 502 and client(s) 506 may be joined through a variety of connections 504, such as a local-area network (LAN), a wide-area network (WAN), or an Internet connection. In one embodiment, server 502 may store and transmit 3-D geometry data (which may be compressed) to one or more of clients 506. The clients 506 receive the compressed 3-D geometry data, decompress it (if necessary) and then render the geometry data. The rendered image is then displayed on the client's display device. The clients render the geometry data and display the image using super-sampled sample buffer and real-time filter techniques described above. In another embodiment, the compressed 3-D geometry data may be transferred between client computers 506.

Generating a Subset of Pixels by Interpolation

Figure 21:
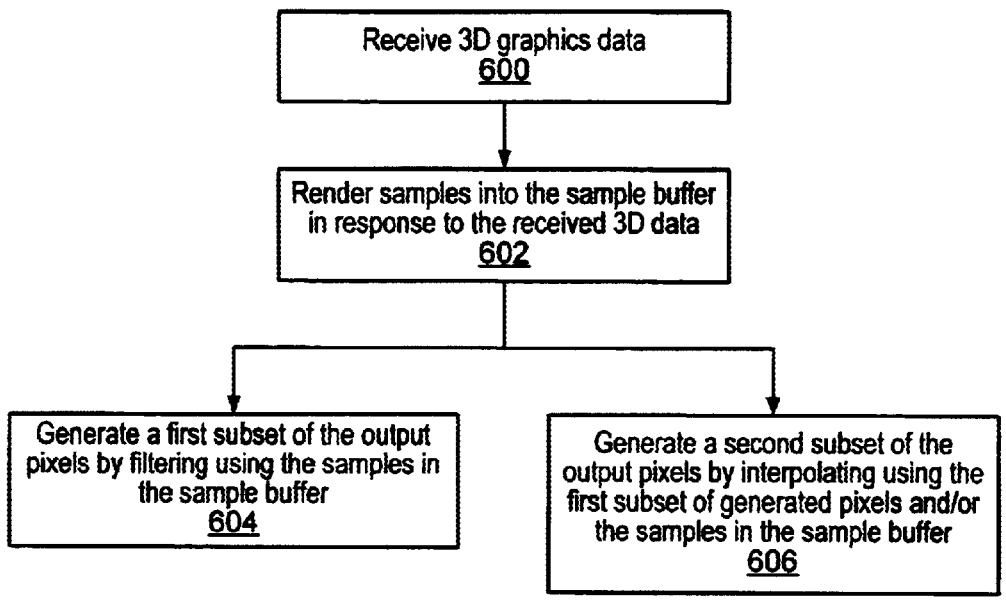
FIG. 21 is a flowchart describing a method for interpolating a subset of the output pixels using filtered output pixels and/or samples.

FIG. 21 shows a flowchart that describes a method whereby a first subset of the output pixels (filtered pixels) is generated by filtering the rendered sample values as described above and whereby the remaining, second subset of output pixels (interpolated pixels) are generated by interpolating the filtered pixels and/or the rendered samples. Depending on the size of the filter and the number of samples that are included in the filtering, the filtering process may be very computationally intensive. In cases where the requested display screen resolution and/or the requested refresh rate exceeds the computational capabilities of the graphics processor, the graphics may generate only a subset of the output pixels by filtering. The remaining pixels are then generated by interpolating the values of the filtered pixels and/or the values of the rendered samples.

In step 600, the graphics system receives 3D graphics data. The graphics system typically receives instructions from the CPU specifying what object to draw, where to draw the object, and with what attributes. In step 602, the graphics processor renders samples according to the 3D instructions received from the CPU and then stores the rendered samples into a sample buffer. Each rendered sample is associated with a position that corresponds to a location in the screen space of the display screen. In step 604, the sample-to-pixel calculation unit generates a first subset of output pixels (filtered pixels) by filtering the rendered samples stored in the sample buffer as described above in this detailed description. In step 606, a second subset of the output pixels (interpolated pixels) is generated by interpolating the first subset of generated output pixels (filtered pixels) and/or the samples in the sample buffer.

Figure 22:
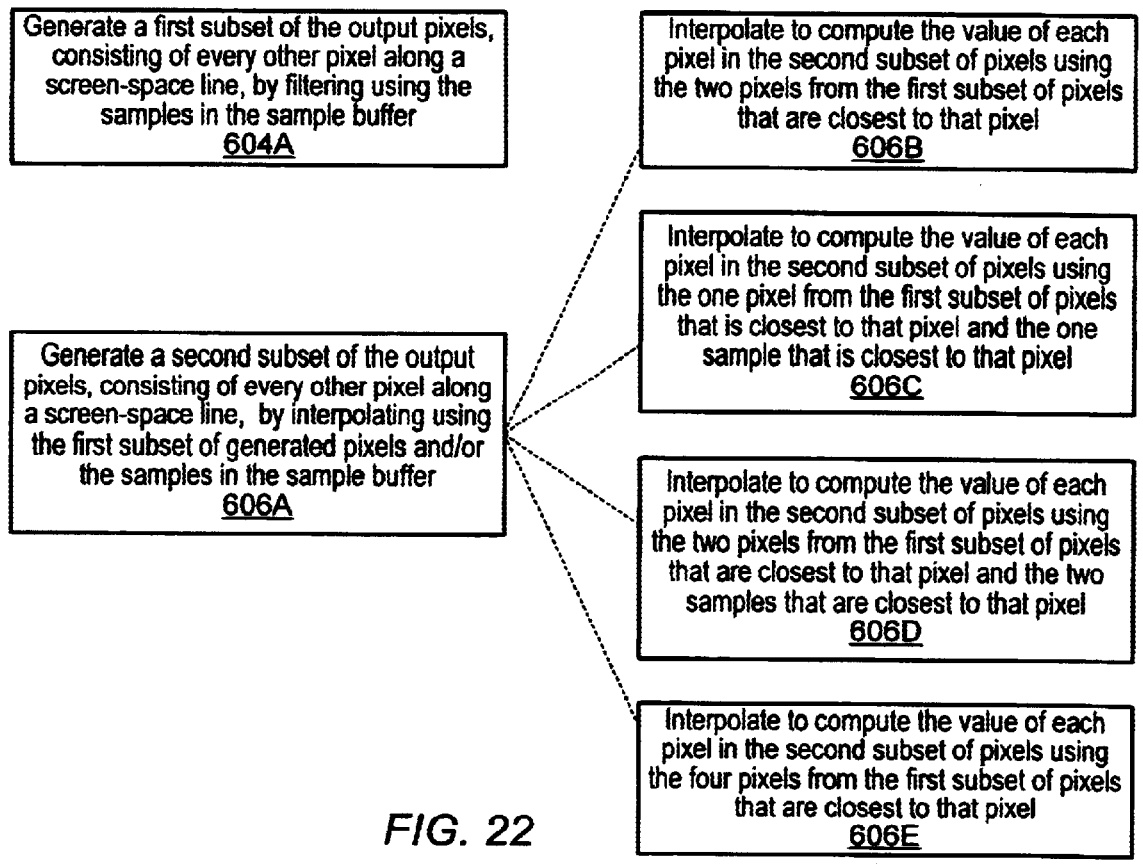
FIG. 22 is a flowchart describing different embodiments of the method for interpolating a subset of the output pixels using filtered output pixels and/or samples.
Figure 23:
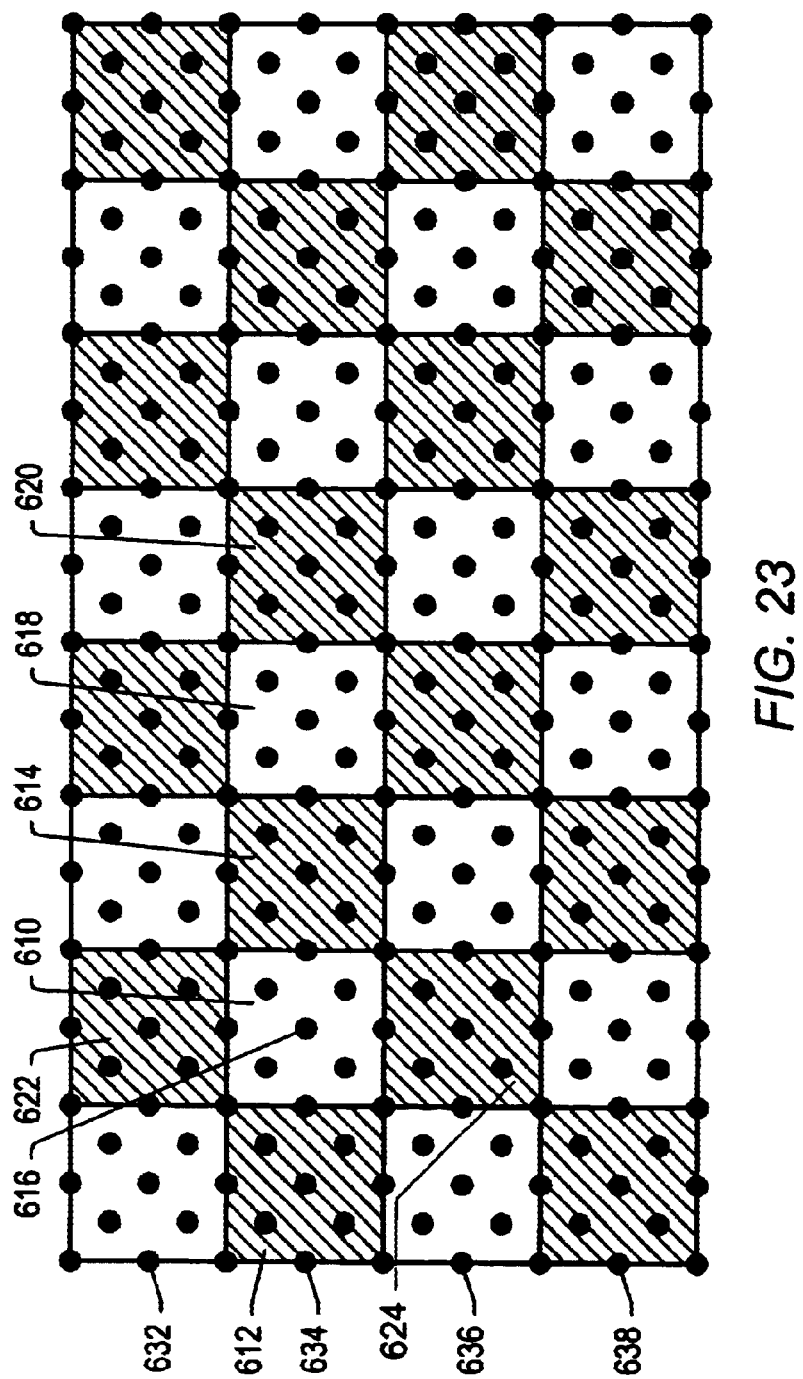
FIG. 23 illustrates an example of a screen space of a display according to different embodiments of the current invention.

Steps 604A and 604B of FIG. 22 show possible implementations of steps 604 and 606 respectively according to one embodiment of the present invention. FIG. 23 shows an example of a portion of the screen space of the display, as described in steps 604A and 604B, showing example locations for samples (small, black circles) and pixels (large, white and crosshatched squares). Note that samples are not typically output to the display. Samples are shown here at the sample locations that correspond to the screen space of the display. In this portion of the screen space of the display, a portion of four screen-space lines (lines 622, 624, 626, and 628) are shown with each line comprising eight pixels. Note that the terms "screen-space line" and "scan line" are used interchangeably herein.

In step 604A, the filtered pixels generated may comprise every other pixel along a screen-space line. The first subset of pixels is generated by filtering the samples stored in the sample buffer. In FIG. 23, the pixels that correspond to the filtered pixels are represented by crosshatched-filled squares. In other embodiments, the filtered pixels may comprise one of every third pixel along a screen-space line, one of every fourth pixel, etc., or some other subset of the pixels along a screen-space line.

In step 604B, the interpolated pixels generated may also comprise every other pixel along a screen-space line. The interpolated pixels are generated by interpolating the filtered generated pixels and/or the samples in the sample buffer. In FIG. 21, the pixels that correspond to the interpolated, second subset of pixels are represented by white squares. In other embodiments, the interpolated pixels may comprise one of every third pixel along a screen-space line, one of every fourth pixel, etc., or some other subset of the pixels along a screen-space line.

Steps 606B–E describe alternative implementations of the interpolation method described in step 606A. In step 606B, each interpolated pixel is computed by taking the average of two filtered pixels that are closest to the center of that pixel. In one embodiment, the two closest filtered pixels are chosen along a screen-space line containing the pixel being generated. Note that, as used herein, averaging of N values refers to adding together all the values with each multiplied by a weight and then dividing the final sum by the sum of all the weights for normalization, i.e., $$\bar{x} = \left(\sum_{i=1}^{N} w_i x_i\right) / \left(\sum_{i=1}^{N} w_i\right),$$

where x are the values and w are the weights. Also note that the weights used in the averaging may be equal. The numerical addition of the pixel values in the averaging may be performed by an adder and the division by two may be performed by a binary shifter, both of which are computationally very efficient processes. For example, referring to FIG. 23, the value of interpolated pixel 610 may be computed by taking the average of the value of filtered pixel 612 and the value of filtered pixel 614. Pixels 612 and 614 represent the pixels that are closest to pixel 610 and are along screen-space line 624 that also contains pixel 610. Note that the term pixel value, as used in the description of all the embodiments relating to the generation of pixel values by interpolation may refer to one or more values for red, green, and/or blue color intensity associated with each pixel. The term pixel value may also refer to other attributes that may be associated with each pixel such as alpha value, z value, etc. Other color space formats may also be used in lieu of the RGB color space, for example, YUV. Other schemes of interpolation may also be used, for example, fitting all the chosen filtered pixels and/or samples along a 1D curve/2D surface and then computing the value of the curve/surface at the desired interpolated pixel.

In an embodiment where the pixel values of the filtered pixels are computed on a scan line-by-scan line basis, the two closest filtered pixels are preferably chosen along the same scan line as the pixel being computed. Doing so minimizes the amount of cached values necessary and enables the sample-to-pixel calculation unit to generate the filtered and interpolated pixels in parallel (alternating between filtered and interpolated pixels). For example, the computational sequence for some of the pixels shown in FIG. 23 may be: filtered pixel 612, filtered pixel 614, interpolated pixel 610, filtered pixel 620, interpolated pixel 618, etc. In such an embodiment, only one pixel value needs to be cached at a time, the value of the filtered pixel-filtered before the last filtered pixel. In an embodiment where the two closest filtered pixels are not chosen to lie along the same screen-space line as the pixel being interpolated, the number of pixel values cached may increase.

The determination of which pixels are closest to the interpolated pixel being interpolated may be performed in a number of ways, for example, based on a relative pixel position of the center of the filtered pixels to the center of the interpolated pixel being computed.

In another embodiment, two separate units may be used to implement the filtering and the interpolating in place of the sample-to-pixel calculation unit. A filtering unit may be used for filtering the rendered samples to generate the filtered pixels, and an interpolating unit may be used for interpolating the filtered pixels and/or the rendered samples to generate the interpolated pixels.

Step 606C describes another alternative implementation of the interpolation described in step 606A. In step 606C, each interpolated pixel is generated by taking the average of a filtered pixel closest to the center of the interpolated pixel and a sample closest to the center of the interpolated pixel. For example, the value of interpolated pixel 610 in FIG. 23 may be computed by taking the average of the value of filtered pixel 612 or the value of filtered pixel 614 and the value of sample 616. The closest filtered pixel is preferably chosen to be the filtered pixel to the immediate left of the interpolated pixel being computed, which minimizes the number of filtered pixels of the first subset that need to be cached. In addition, this enables the filtered and interpolated pixels to be computed in parallel (alternating between filtered and interpolated pixels). In this embodiment, referring to FIG. 23, an example order of pixel computation may be: filtered pixel 612, interpolated pixel 610, filtered pixel 614, interpolated pixel 618, filtered pixel 620, etc.

Step 606D describes another alternative implementation of the interpolation described in step 606A. In step 606D, each interpolated pixel is computed by taking the average of a filtered pixel that is closest to the center of that pixel and a sample closest to the center of that pixel. For example, the value of interpolated pixel 610 in FIG. 23 may be computed by taking the average of the value of pixel 612 and the value of sample 616. In this embodiment, no pixel values require caching.

Step 606E describes another alternative implementation of the interpolation described in step 606A. In step 606E, each interpolated pixel is computed by taking the average of four filtered pixels that are closest to the center of that pixel. For example, the value of interpolated pixel 610 in FIG. 23 may be computed by taking the average of filtered pixel 612, filtered pixel 622, filtered pixel 614, and filtered pixel 624. Implementation of this embodiment involves the caching of many filtered pixels. For this example, the filtered pixels that need to stored in memory for the calculation of interpolated pixel 610 are: all the filtered pixels along line 632 and to the right of pixel 622, all the filtered pixels along line 634, and all the filtered pixels along line 636 and to the left of pixel 624. This implementation may be broadened to include the interpolation of N filtered pixels (preferably closest pixels), where N is a positive integer preferably between 1 and 10.

Any other combination of the filtered pixels and/or samples may be used for the generation of the interpolated pixels. Furthermore, many different patterns may be used for selecting which pixels to interpolate and which pixels to filter. For example, in some embodiments pixels may be interpolated based on filtered pixels above and below the pixel to be interpolated (i.e., vertically). Another possible pattern may be to perform interpolation on a scan-line basis or a checkerboard basis (i.e., every other pixel, offset on a scan-line basis). As mentioned above, the interpolation is used to prevent the graphics processor from having to generate all the pixels using filtering, a computationally intensive process.

In another embodiment, different regions of the display may comprise different ratios of filtered to interpolated pixels. In regions where a higher quality image is desired, for example, a higher ratio of filtered to interpolated pixels may be used. An example of a region where a higher quality image may be desired is foveal region 354 shown in FIG. 15. Foveal region 354 is a region of the display where the eye of an observer is focused. Images in foveal region 354 are focused on an area of the retina of the eye with the highest level of acuity. In this embodiment, the graphics system may determine the foveal region for the display using head and eye tracking techniques as described above in this detailed description. Medial region 352 and peripheral region 350 are regions where a lower quality image may be sufficient. Thus, a lower ratio of filtered to interpolated pixels may be used in those regions. The graphics system may devote more processing power to areas where a high quality image may be desired and less processing power to areas where a lower quality image may be sufficient.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note that the headings used herein are for organizational purposes only and are not meant to limit the description provided herein or the claims attached hereto.

What is claimed is:

1. A graphics system comprising:
a rendering unit operable to receive graphics data, wherein said rendering unit is operable to render a plurality of samples based on said graphics data;
a sample buffer coupled to store said samples from said rendering unit; and
a sample-to-pixel calculation unit coupled to said sample buffer,
wherein said sample-to-pixel calculation unit is operable to generate a plurality of pixels for display on a display device,
wherein a first subset of said plurality of pixels is generated by filtering said plurality of samples, and
wherein a second subset of said plurality of pixels is generated by interpolating said first subset of said plurality of pixels.

2. The graphics system of claim 1,
wherein each sample in said plurality of samples corresponds to a location in a screen space of said display device; and
wherein each pixel in said plurality of pixels corresponds to a location in said screen space of said display device.

3. The graphics system of claim 1, wherein said second subset of said plurality of pixels is generated by interpolating said first subset of said pixels and said plurality of samples.

4. The graphics system of claim 1,
wherein said first subset of said plurality of pixels comprises every other pixel in
a scan line of said display device, and
wherein said second subset of said plurality of pixels comprises the remaining pixels in said scan line that are not part of said first subset.

5. The graphics system of claim 1,
wherein said first subset of said plurality of pixels comprises one out of every N pixels in a scan line of said display device, and wherein N is an integer between 1 and 10, and
wherein said second subset of said plurality of pixels comprises the remaining pixels in said scan line that are not part of said first subset.

6. The graphics system of claim 1, wherein each respective pixel of said second subset of said plurality of pixels is generated by interpolating two closest pixels to said respective pixel, and wherein said first subset of said plurality of pixels comprises said two closest pixels.

7. The graphics system of claim 6, wherein said respective pixel and said two closest pixels are on the same scan line.

8. The graphics system of claim 1, wherein each respective pixel of said second subset of said plurality of pixels is generated by interpolating a closest pixel to said respective pixel and a closest sample to said respective pixel, wherein said first subset of said plurality of pixels comprises said closest pixel.

9. The graphics system of claim 1, wherein each respective pixel of said second subset of said plurality of pixels is generated by interpolating two closest pixels to said respective pixel and two closest samples to said respective pixel, wherein said first subset of said plurality of pixels comprises said two closest pixels.

10. The graphics system of claim 1, wherein each respective pixel of said second subset of said plurality of pixels is generated by interpolating four closest pixels to said respective pixel, and wherein said first subset of said plurality of pixels comprises said four closest pixels.

11. The graphics system of claim 1, wherein each respective pixel of said second subset of said plurality of pixels is generated by interpolating using N closest pixels to said respective pixel, and wherein said first subset of said plurality of pixels comprises said N closest pixels, and wherein N is an integer between 1 and 10.

12. The graphics system of claim 1, further wherein a first region of said display device comprises pixels only from said first subset of said plurality of pixels and wherein a second region of said display device comprises pixels from said first subset of said plurality of pixels and from said second subset of said plurality of pixels.

13. The graphics system of claim 1, wherein said sample-to-pixel calculation unit is operable to generate said plurality of pixels and provide said plurality of pixels directly to the display device without an intervening frame buffer therebetween.

14. The graphics system of claim 1, wherein said sample buffer is configured to double buffer at least a portion of said plurality of samples.

15. The graphics system of claim 1, wherein said sample-to-pixel calculation unit is configured to generate said plurality of pixels on one of: a real time basis or an on-the-fly basis.

16. The graphics system of claim 1, further comprising said display device, wherein said display device is operable to receive and display said plurality of pixels.

17. The graphics system of claim 1, wherein said sample-to-pixel calculation unit is configured to selectively turn said interpolation on and off based on the number of output pixels per frame.

18. The graphics system of claim 1, wherein said sample-to-pixel calculation unit is configured to selectively turn said interpolation on and off based on the refresh rate of the display device.

19. The graphics system of claim 1, wherein said sample-to-pixel calculation unit is configured to selectively turn said interpolation on and off based on a number of bits used to represent each of a color value.

20. The graphics system of claim 1, wherein said second subset of pixels is generated by interpolation based on selected pixels from said first subset that are located above and below each of said second subset of pixels.

21. The graphics system of claim 1, wherein said second subset of pixels is generated by vertical interpolation based on selected pixels from neighboring scan lines.

22. A graphics system comprising:
a rendering unit operable to receive graphics data, wherein said rendering unit is operable to render a plurality of samples in response to said graphics data, wherein each sample in said plurality of samples corresponds to a location in a screen space of a display device;
a sample buffer coupled to said rendering unit, wherein said sample buffer is operable to store said plurality of samples;
a filtering unit coupled to said sample buffer, wherein said filtering unit is operable to generate a first plurality of pixels by filtering said plurality of samples, and
an interpolating unit coupled to said filtering unit, wherein said interpolating unit is operable to generate a second plurality of pixels to said display device, wherein said second plurality of pixels is generated by interpolating said first plurality of pixels.

23. The graphics system of claim 22, wherein said filtering unit is an adder and a binary shifter.

24. The graphics system of claim 22, wherein said second plurality of pixels is generated by interpolating said first plurality pixels and said plurality of samples.

25. The graphics system of claim 22, wherein said first subset of said plurality of pixels comprises every other pixel in a scan line of said display device, and wherein said second subset of said plurality of pixels comprises the remaining pixels in said scan line that are not part of said first subset.

26. The graphics system of claim 22, wherein said first subset of said plurality of pixels comprises one out of every N pixels in a scan line of said display device, wherein said second subset of said plurality of pixels comprises the remaining pixels in said scan line that are not part of said first subset, and wherein N is an integer between 1 and 10.

27. The graphics system of claim 22, wherein each respective pixel of said second subset of said plurality of pixels is generated by interpolating two closest pixels to said respective pixel, and wherein said first subset of said plurality of pixels comprises said two closest pixels.

28. The graphics system of claim 25, wherein said respective pixel and said two closest pixels are on the same scan line.

29. The graphics system of claim 22, wherein each respective pixel of said second subset of said plurality of pixels is generated by interpolating a closest pixel to said respective pixel and a closest sample to said respective pixel, wherein said first subset of said plurality of pixels comprises said closest pixel.

30. The graphics system of claim 22, wherein each respective pixel of said second subset of said plurality of pixels is generated by interpolating using two closest pixels to said respective pixel and two closest samples to said respective pixel, wherein said first subset of said plurality of pixels comprises said two closest pixels.

31. The graphics system of claim 22, wherein each respective pixel of said second subset of said plurality of pixels is generated by interpolating four closest pixels to said respective pixel, and wherein said first subset of said plurality of pixels comprises said four closest pixels.

32. The graphics system of claim 22, wherein each respective pixel of said second subset of said plurality of pixels is generated by interpolating N closest pixels to said respective pixel, wherein said first subset of said plurality of pixels comprises said N closest pixels, and wherein N is an integer from 1 to 10.

33. The graphics system of claim 22, further wherein a first region of said display device comprises pixels only from said first subset of said plurality of pixels and wherein a second region of said display device comprises pixels from said first subset of said plurality of pixels and from said second subset of said plurality of pixels.

34. The graphics system of claim 22, wherein said sample-to-pixel calculation unit is operable to generate said plurality of pixels and provide said plurality of pixels directly to the display device without an intervening frame buffer therebetween.

35. The graphics system of claim 22, wherein said sample buffer is configured to double buffer at least a portion of said plurality of samples.

36. The graphics system of claim 22, wherein said sample-to-pixel calculation unit is configured to generate said plurality of pixels on one of: a real time basis or an on-the-fly basis.

37. The graphics system of claim 22, further comprising said display device, wherein said display device is operable to receive and display said plurality of pixels.

38. A method for generating pixels for a display device, the method comprising:
receiving graphics data;
rendering a plurality of samples into a sample buffer in response to said graphics data;
filtering using said plurality of samples to generate a first subset of output pixels; and
interpolating the first subset of output pixels to generate a second subset of output pixels.

39. The method of claim 38, wherein said interpolating comprises interpolating said first plurality pixels and said plurality of samples.

40. The method of claim 38, wherein said filtering comprises generating every other output pixel in the scan line of said display device, and wherein said interpolating comprises generating the remaining pixels in the scan line.

41. The method of claim 38, wherein said filtering comprises generating one out of every N output pixels in the scan line of said display device, and wherein said interpolating comprises generating the remaining pixels in the scan line, wherein said N is an integer between 1 and 10.

42. The method of claim 38, wherein said interpolating to generate each respective of said second plurality of pixels comprises interpolating two closest pixels to said respective pixel, and wherein said first plurality of pixels comprises said two closest pixels.

43. The method of claim 41, wherein said interpolating to generate said respective pixel comprises interpolating said two closest pixels that are located on the same scan line of said display device as said respective pixel.

44. The method of claim 38, wherein said interpolating to generate each respective pixel of said second plurality of pixels comprises interpolating a closest pixel to said respective pixel and a closest sample to said respective pixel, and wherein said first plurality of pixels comprises said closest pixel.

45. The method of claim 38, wherein said interpolating to generate each respective pixel of said second plurality of pixels comprises interpolating two closest pixels to said respective pixel and two closest samples to said respective pixel, wherein said first plurality of pixels comprises said two closest pixels.

46. The method of claim 38, wherein said interpolating to generate each respective pixel of said second plurality of pixels comprises interpolating four closest pixels to said respective pixel and wherein said first plurality of pixels comprises said four closest pixels.

47. The method of claim 38, wherein said interpolating to generate each respective pixel of said second plurality of pixels comprises interpolating N closest pixels to said respective pixel, wherein said first plurality of pixels comprises said N closest pixels, and wherein said N is an integer between 1 and 10.

48. The method of claim 38, wherein said filtering comprises generating said first plurality of pixels in a first region of said display device and in a second region of said display device, and wherein said interpolating comprises generating said second plurality of pixels in said second region of said display device.

49. The method of claim 48, wherein said first region and said second region are determined according to a point of foveation of an observer.

50. The method of claim 49, said point of foveation of said observer is determined by an eye-tracking sensor.

51. The method of claim 49, said point of foveation of said observer is determined by a head-tracking sensor.

52. The method of claim 48, wherein said first region and said second region are determined according to a location of a point of interest in a rendered scene.

53. The method of claim 48, wherein said first region and said second region are determined according to a position of a cursor on said display device.

54. The method of claim 48, wherein said first region is located in the center of said display device.

55. The method of claim 38, wherein said filtering comprises selecting and filtering said plurality of stored samples to generate output pixels that are provided directly to said display device without an intervening frame buffer therebetween.

56. The method of claim 38, wherein said interpolating comprises selecting and interpolating said first plurality of said pixels to generate said second plurality of output pixels that are provided directly to said display device without an intervening frame buffer therebetween.

57. The method of claim 38, wherein said rendering said plurality of samples into said sample buffer includes double buffering at least a portion of said plurality of samples.

58. The method of claim 38, wherein said filtering comprises selecting and filtering said plurality of samples to form output pixels on one of: a real time basis or an on-the-fly basis.

59. The method of claim 38, wherein said interpolating comprises selecting and interpolating said first plurality of pixels to generate said second plurality of pixels on one of: a real time basis or an on-the-fly basis.

60. A computer system comprising:
a central processing unit (CPU);
a main system memory coupled to said CPU; and
a graphics system comprising:
    a rendering unit operable to receive graphics data from said main system memory, wherein said rendering unit is operable to render a plurality of samples based on said graphics data;
    a buffer coupled to said rendering unit, wherein said buffer is operable to store said plurality of samples; and
    a sample-to-pixel calculation unit coupled to said buffer, wherein said sample-to-pixel calculation unit is operable to generate a plurality of pixels for display device on a display device, wherein a first subset of said plurality of pixels is generated by filtering said plurality of samples, and wherein a second subset of said plurality of pixels is generated by interpolating using said first subset of said plurality of pixels.

61. The computer system of claim 60, further comprising a keyboard device.

62. The computer system of claim 60, further comprising a display device.

* * * * *

UNITED STATES PATENT AND TRADEMARK OFFICE
CERTIFICATE OF CORRECTION

PATENT NO.   : 6,664,955 B1
DATED        : December 16, 2003
INVENTOR(S)  : Deering It is certified that error appears in the above-identified patent and that said Letters Patent is hereby corrected as shown below:

Column 36,
Lines 26-29, please delete "filtering...pixels." and substitute
-- filtering using said plurality of samples to generate a first plurality of output pixels; and
   interpolating at least a subset of said first plurality of pixels to generate a second plurality of output pixels. --

Signed and Sealed this

First Day of June, 2004

JON W. DUDAS
*Acting Director of the United States Patent and Trademark Office*